(12) United States Patent
Epple et al.

(10) Patent No.: US 10,924,517 B2
(45) Date of Patent: *Feb. 16, 2021

(54) PROCESSING NETWORK TRAFFIC BASED ON ASSESSED SECURITY WEAKNESSES

(71) Applicant: Sophos Limited, Abingdon (GB)

(72) Inventors: Scott McVicker Epple, Sudbury, MA (US); Jonathan Jesse, Hollis, NH (US)

(73) Assignee: Sophos Limited, Abingdon (GB)

( * ) Notice: Subject to any disclaimer, the term of this patent is extended or adjusted under 35 U.S.C. 154(b) by 347 days.

This patent is subject to a terminal disclaimer.

(21) Appl. No.: 15/890,763

(22) Filed: Feb. 7, 2018

(65) Prior Publication Data

US 2019/0245894 A1    Aug. 8, 2019

(51) Int. Cl.
| | |
|---|---|
| *H04L 29/06* | (2006.01) |
| *G06F 21/57* | (2013.01) |
| *G06F 21/56* | (2013.01) |
| *H04L 12/26* | (2006.01) |
| *H04L 9/08* | (2006.01) |
| *H04L 9/06* | (2006.01) |

(52) U.S. Cl.
CPC ............ *H04L 63/205* (2013.01); *G06F 21/56* (2013.01); *G06F 21/577* (2013.01); *H04L 63/0227* (2013.01); *H04L 63/1425* (2013.01); *H04L 63/1433* (2013.01); *H04L 63/1483* (2013.01); *H04L 9/0631* (2013.01); *H04L 9/0816* (2013.01); *H04L 43/10* (2013.01)

(58) Field of Classification Search
CPC ............ H04L 63/1483; H04L 63/1433; H04L 63/1441; H04L 63/20; H04L 63/145; H04L 63/14; H04L 63/105; H04L 51/08; H04W 12/12; H04W 24/00; G06F 21/577; G06F 21/554; G06F 21/552; G06F 21/55; G06F 21/00; G06F 2221/034; G06Q 10/0635; G06N 3/082
See application file for complete search history.

(56) References Cited

U.S. PATENT DOCUMENTS

| | | | |
|---|---|---|---|
| 8,028,335 | B2 | 9/2011 | Udezue et al. |
| 8,220,047 | B1 | 7/2012 | Soghoian et al. |
| 8,423,483 | B2 | 4/2013 | Sadeh-Koniecpol et al. |

(Continued)

FOREIGN PATENT DOCUMENTS

| | | |
|---|---|---|
| WO | WO-2012068255 | 5/2012 |
| WO | WO-2015123544 | 8/2015 |
| WO | WO-2019156786 | 8/2019 |

OTHER PUBLICATIONS

"U.S. Appl. No. 15/666,894 Final Office Action dated Aug. 23, 2019", 16 pages.

(Continued)

*Primary Examiner* — Brian F Shaw
(74) *Attorney, Agent, or Firm* — Strategic Patents, P.C.

(57) ABSTRACT

A threat management facility generates a simulated phishing threat based on one or more characteristics of users of an enterprise network and transmits the simulated phishing threat to the users of the enterprise network. Based on whether a user fails to respond appropriately to the simulated phishing threat, the threat management facility may adjust a profile of the user. Network traffic to and from an endpoint associated with the user may be processed according to the adjusted profile.

16 Claims, 15 Drawing Sheets

(56) References Cited

U.S. PATENT DOCUMENTS

| | | | |
|---|---|---|---|
| 8,484,741 B1* | 7/2013 | Chapman | G06Q 10/107 726/25 |
| 8,615,807 B1 | 12/2013 | Belani et al. | |
| 8,635,703 B1 | 1/2014 | Belani et al. | |
| 8,910,287 B1 | 12/2014 | Belani et al. | |
| 8,955,109 B1* | 2/2015 | Satish | G06F 21/577 726/22 |
| 9,009,834 B1 | 4/2015 | Ren et al. | |
| 9,076,342 B2 | 7/2015 | Brueckner et al. | |
| 9,256,739 B1 | 2/2016 | Roundy et al. | |
| 9,373,267 B2 | 6/2016 | Sadeh-Koniecpol et al. | |
| 9,384,677 B2 | 7/2016 | Donovan et al. | |
| 9,398,029 B2 | 7/2016 | Ferrara et al. | |
| 9,473,533 B2 | 10/2016 | Faltyn et al. | |
| 9,483,742 B1 | 11/2016 | Ahmed | |
| 9,547,998 B2 | 1/2017 | Wescoe et al. | |
| 2005/0204162 A1* | 9/2005 | Rayes | H04L 61/2061 726/5 |
| 2006/0281056 A1 | 12/2006 | Ouderkirk et al. | |
| 2007/0027992 A1 | 2/2007 | Judge et al. | |
| 2007/0107059 A1 | 5/2007 | Chasin et al. | |
| 2009/0089859 A1 | 4/2009 | Cook et al. | |
| 2009/0119740 A1 | 5/2009 | Alperovitch et al. | |
| 2011/0296519 A1 | 12/2011 | Ide et al. | |
| 2012/0124671 A1 | 5/2012 | Fritzson et al. | |
| 2014/0032691 A1 | 1/2014 | Barton et al. | |
| 2014/0199664 A1 | 7/2014 | Sadeh-Koniecpol et al. | |
| 2014/0230060 A1 | 8/2014 | Higbee et al. | |
| 2014/0230061 A1 | 8/2014 | Higbee et al. | |
| 2014/0282816 A1 | 9/2014 | Xie et al. | |
| 2015/0188949 A1 | 7/2015 | Mahaffey et al. | |
| 2015/0229664 A1* | 8/2015 | Hawthorn | H04L 63/1433 726/25 |
| 2015/0264084 A1 | 9/2015 | Kashyap et al. | |
| 2015/0287336 A1 | 10/2015 | Scheeres | |
| 2015/0312266 A1* | 10/2015 | Thomas | H04L 43/10 726/24 |
| 2015/0319178 A1 | 11/2015 | Desai et al. | |
| 2016/0164886 A1* | 6/2016 | Thrash | H04L 63/1416 726/23 |
| 2016/0269440 A1 | 9/2016 | Hartman | |
| 2016/0301705 A1 | 10/2016 | Higbee et al. | |
| 2016/0301716 A1 | 10/2016 | Sadeh-Koniecpol et al. | |
| 2016/0330238 A1 | 11/2016 | Hadnagy | |
| 2017/0103674 A1 | 4/2017 | Sadeh-Koniecpol et al. | |
| 2017/0104778 A1 | 4/2017 | Shabtai | |
| 2017/0251009 A1 | 8/2017 | Irimie et al. | |
| 2017/0318046 A1 | 11/2017 | Weidman | |
| 2018/0041537 A1 | 2/2018 | Bloxham et al. | |
| 2019/0303583 A1 | 10/2019 | Hosking et al. | |

OTHER PUBLICATIONS

"U.S. Appl. No. 15/666,894 Non-Final Office Action dated Mar. 5, 2019", 12 pages.

IPO, "UK Application No. 1712415.7 Search Report dated Dec. 15, 2017", 5 pages.

ISA, "PCT Application No. PCT/US19/13823 International Search Report and Written Opinion dated Mar. 20, 2019", 13 pages.

"U.S. Appl. No. 15/666,894 Non-Final Office Action dated Feb. 12, 2020", 15 pages.

"U.S. Appl. No. 15/666,894 Final Office Action dated Jun. 8, 2020", 16 pages.

ISA, "PCT Application No. PCT/US19/13823 International Preliminary Report on Patentability dated Aug. 20, 2020", 9 pages.

USPTO, "U.S. Appl. No. 15/666,894 Non-Final Office Action dated Nov. 6, 2020", 17 pages.

* cited by examiner

PROCESSING NETWORK TRAFFIC BASED ON ASSESSED SECURITY WEAKNESSES

BACKGROUND

Phishing threats are a common and persistent concern for operators of computing networks. While significant, automated, technology-based solutions may be employed to harden networks against outside intrusions, it is much more difficult to protect a network against threats that originate through an authorized network user. Because of this, phishing style attacks are commonly employed by would-be intruders. Phishing attacks frequently involve "social engineering" techniques, whereby the attacker attempts to exploit an unsophisticated or simply careless network user into giving up his or her access credentials or otherwise provide an unobstructed avenue for the attacker to access a network.

Because such attacks rely more on user behaviors than on the technical aspects of a network, user training is commonly used to attempt to reduce the likelihood of a network compromise due to phishing. Given the limitations associated with designing and rolling out user training, however, user training may have limited impact on modifying user behavior. Further, the behavioral changes produced by user training vary from user to user, leading to unpredictable results. Therefore, there exists a need for more reliably accounting for the role of user behavior in security weaknesses of networks.

SUMMARY

A threat management facility generates a simulated phishing threat based on one or more characteristics of users of an enterprise network and transmits the simulated phishing threat to the users of the enterprise network. Based on whether a user fails to respond appropriately to the simulated phishing threat, the threat management facility may adjust a profile of the user. Network traffic to and from an endpoint associated with the user may be processed according to the adjusted profile.

According to one aspect, a method of securing a computer network including selecting a security weakness for users of an enterprise network, transmitting electronic communications to the users of the enterprise network, the electronic communications containing a response object corresponding to the security weakness, detecting a request from an endpoint associated with the response object, determining that a threat assessment failure related to the security weakness has occurred based on detecting the request from the endpoint, for a user associated with the endpoint, adjusting a profile of the user based on a determination that the threat assessment failure occurred, and processing network traffic to and from the endpoint according to the adjusted profile of the user associated with the endpoint.

In certain implementations, the security weakness may include one or more of a phishing vulnerability and missing security updates.

In some implementations, the electronic communications may include at least an attached document, a user identifier, and executable code embedded within the attached document, and the executable code may be configured to transmit the response object and the user identifier from the endpoint when the attached document is opened. The electronic communications may include human readable text including an instruction to the user to open the attached document.

In certain implementations, adjusting the profile of the user may include increasing detection sensitivity for at least one of a static detection antimalware agent, a dynamic behavior antimalware agent, a firewall, a blacklist, and a whitelist.

In some implementations, adjusting the profile of the user may include adjusting a security policy for one or more additional computing devices associated with the user.

In certain implementations, adjusting the profile of the user may include associating the user with a group of users corresponding to the threat assessment failure. For example, processing the network traffic may include, at a network device of the enterprise network, applying a network policy to the network traffic associated with the group of users.

In some implementations, the network traffic may be processed at one or more of an endpoint, a firewall, or a wireless access point of the enterprise network.

In certain implementations, processing the network traffic may include coloring network packets from the endpoint according to the adjusted profile of the user associated with the endpoint.

In some implementations, processing the network traffic to and from the endpoint according to the adjusted profile of the user may include restricting network traffic between the endpoint and resources outside of the enterprise network.

In certain implementations, the response object may include a Uniform Resource Locator (URL).

In some implementations, the method may further include generating the electronic communications containing the response object, wherein each of the electronic communications may be customized for at least one of a name, a user identifier, a title, or an organizational role of one of the users of the enterprise network.

According to another aspect, a system for computer network security may include one or more endpoints coupled to an enterprise network, and a threat management facility for the enterprise network in a communicating relationship with the one or more endpoints, the threat management facility including a processor and a memory, the memory bearing computer executable code executable by the processor to perform the steps of: selecting a security weakness for users of an enterprise network, transmitting electronic communications to the users of the enterprise network, the electronic communications containing a response object corresponding to the security weakness, detecting a request, from one of the one or more endpoints, associated with the response object, determining that a threat assessment failure related to the security weakness has occurred based on detecting the request from the one of the one or more endpoints, for a user associated with the one of the one or more endpoints, associating the user with a group of users corresponding to the threat assessment failure, and applying a network policy to network traffic associated with the group of users corresponding to the threat assessment failure.

In certain implementations, the threat management facility may be in a communicating relationship with the one or more endpoints via a heartbeat system.

In some implementations, the threat management facility may be integrated into a firewall, gateway, or access point of the enterprise network.

In certain implementations, applying the network policy may restrict the network traffic associated with the group of users.

According to another aspect, a computer program product may be encoded on one or more non-transitory computer storage media, the computer program product may include instructions that, when executed by one or more computing devices, cause the one or more computing devices to perform operations including selecting a security weakness for users of an enterprise network, transmitting electronic communications to the users of the enterprise network, the electronic communications containing a response Uniform Resource Locator (URL) corresponding to the security weakness, detecting a request from an endpoint to the response URL, determining that a threat assessment failure related to the security weakness has occurred based on detecting the request to the response URL from the endpoint, for a user associated with the endpoint, adjusting a profile of the user based on a determination that the threat assessment failure occurred, and processing network traffic to and from the endpoint according to the adjusted profile of the user associated with the endpoint.

In certain implementations, adjusting the profile for the user may include increasing detection sensitivity for at least one of a static detection antimalware agent, a dynamic behavior antimalware agent, a firewall, a blacklist, and a whitelist.

In some implementations, processing the network traffic to and from the endpoint according to the adjusted profile of the user may include restricting network traffic between the endpoint and resources outside of the enterprise network.

BRIEF DESCRIPTION OF THE FIGURES

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
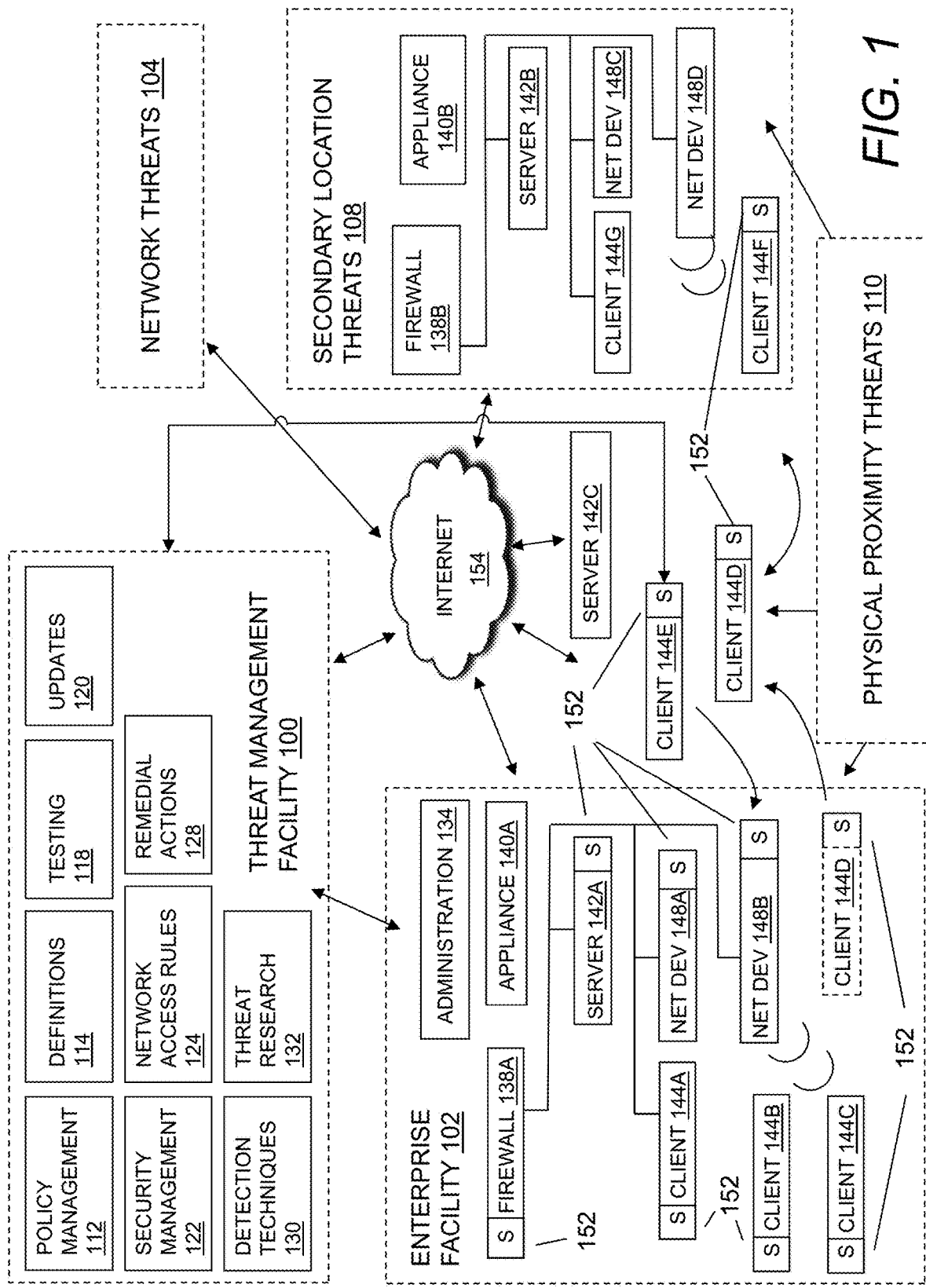
FIG. 1 illustrates an environment for threat management.

FIG. 1 illustrates an environment for threat management. Specifically, FIG. 1 depicts a block diagram of a threat management system providing protection to an enterprise against a plurality of threats—a context in which the following techniques may usefully be deployed. In one aspect, the policy management facility 112 may be used to update the policies of all corporate computing assets with a proper policy control facility or it may update a select few. By using the threat management facility 100 to facilitate setting, updating and controlling such policies, a corporation (or other applicable entity) only needs to be concerned with keeping the threat management facility 100 up to date on such policies. The threat management facility 100 can take care of updating the other corporate computing assets.

It should be understood that the threat management facility 100 may provide multiple services that may include policy management. Attention is now directed to a description of certain capabilities and components of the threat management system 100.

The threat management facility 100 may provide an enterprise facility 102 with protection from computer-based malware, including viruses, spyware, adware, Trojans, intrusion, spam, policy abuse, uncontrolled access, and the like. The enterprise facility 102 may be a networked computer-based infrastructure for any entity. The enterprise facility 102 may, for example, be a facility for any corporate, commercial, educational, or governmental enterprise or the like. The enterprise facility 102 may include a computer network, which may be distributed amongst a plurality of facilities and in a plurality of geographical locations. The enterprise facility 102 computer network may include administration 134, a firewall 138A, an appliance 140A, a server 142A, network devices 148A-B, clients 144A-D, and the like. The aforementioned devices within the enterprise facility 102 computer network may be protected by endpoint computer security facilities 152. It will be understood that any reference herein to client facilities may include the clients 144A-D shown in FIG. 1 and vice-versa.

The threat management facility 100 may provide a plurality of functions through components or platforms such as security management facility 122, a policy management facility 112, an update facility 120, a threat definition facility 114, a network access rules facility 124, a remedial action facility 128, a detection techniques facility 130, a testing facility 118, a threat research facility 132, and the like. In embodiments, the threat protection provided by the threat management facility 100 may extend threat management functions beyond the network boundaries of the enterprise facility 102 to include clients 144D (or client facilities) that have moved into network connectivity not directly associated with or controlled by the enterprise facility 102. Threats to client facilities may come from a plurality of sources, such as from network threats 104, physical proximity threats 110, secondary location threats 108, and the like. Clients 144A-D may be protected from threats even when the respective client 144A-D is not located in association with the enterprise 102, such as when one or more of clients 144E-F moves in and out of the enterprise facility 102, when interfacing with an unprotected server 142C through the Internet 154, when the client 144F is moving into an area posing secondary location threats 108 such as when interfacing with unprotected components 140B, 142B, 148C, 148D, and the like.

The threat management facility 100 may be provided as a stand-alone solution or may be integrated into or cooperate with one or more third-party products.

The security management facility 122 may be operable to scan the client facility files for malicious code, remove or quarantine certain applications and files, prevent certain actions, perform remedial actions, and perform other security measures. In embodiments, scanning the client facility may include scanning some or all of the files stored to the client facility on a periodic basis, scanning an application when the application is executed, scanning files as the files are transmitted to or from the client facility, or the like. Scanning the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

The security management facility 122 may provide email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, the security management facility 122 may provide for web security and control, e.g., to help to detect or block viruses, spyware, malware, unwanted applications, help control web browsing, and the like. Web security and control may include Internet use policies, reporting on suspect devices, security and content filtering, active monitoring of network traffic, URI filtering, and the like. In an embodiment, the security management facility 122 may provide for network access control, which may provide control over network connections. Network access control may stop unauthorized, guest, or non-compliant systems from accessing networks, and may control network traffic. In addition, network access control may control access to virtual private networks (VPN), where VPNs provide a communications network tunneled through another network to establish a logical connection and act as a virtual network. In embodiments, a VPN may be treated in the same manner as a physical network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Behavioral protection, as distinguished from runtime protection, can advantageously identify malicious code at a gateway or file servers and delete the code before the code can reach endpoint computers and the like.

The security management facility 122 may provide reputation filtering to target or identify sources of known malware. For instance, reputation filtering may use lists of URIs of known sources of malware or known suspicious IP addresses, or domains that, when detected, invoke an action by the threat management facility 100, such as dropping packets, terminating connections or taking other remedial action. By dropping the source before any interaction can occur, potential threat sources may be thwarted before any exchange of data can be made.

The security management facility 122 may support overall security of the enterprise facility 102 network or set of enterprise facility 102 networks, e.g., by providing updates of malicious code information to the enterprise facility 102 network and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without direct control of the administration facility 134, manually transmitted by the administration facility 134, or otherwise distributed. The security management facility 122 may manage the receipt of malicious code descriptions from a provider, distribution of the malicious code descriptions to enterprise facility 102 networks, distribution of the malicious code descriptions to client facilities, and so forth.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, and so forth. Policies may be maintained by the administration facility 134, through the threat management facility 100, in association with a third party, or the like. For example, a policy may restrict IM activity to support personnel only for communicating with customers. This may allow communication for departments requiring access, but may maintain the network bandwidth for other activities by restricting the use of IM to only the personnel requiring access to instant messaging (IM) in support of the enterprise facility 102. The policy management facility 112 may be a stand-alone application, may be part of the network server facility 142A, may be part of the enterprise facility 102 network, may be part of the client facility, or the like.

The threat management facility 100 may provide configuration management, which may be similar to policy management, but may specifically examine the configuration set of applications, operating systems, hardware, and the like, and manage changes to their configurations. The threat management facility 100 may also remove applications that potentially interfere with the operation of the threat management facility 100, such as third-party products that may also be attempting similar threat management functions.

Threat management against a quickly evolving malware environment may require timely updates, and thus an update management facility 120 may be provided by the threat management facility 100. In addition, a policy management facility 112 may also require update management (e.g., as provided by the update facility 120 herein described). The update management for the security management facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

The security management facility 122 and policy management facility 112 may push information to the enterprise facility 102 network and/or client facility. The enterprise facility 102 network and/or client facility may also or instead pull information from the security management facility 122 and policy management facility 112 network servers 142, or there may be a combination of pushing and pulling of information between the security management facility 122 and policy management facility 112 network servers 142, enterprise facility 102 network, and client facilities, or the like. For example, the enterprise facility 102 network and/or client facility may pull information from the security management facility 122 and policy management facility 112 network servers 142. The enterprise facility 102 network and/or client facility may request the information using the security management facility 122 and policy management facility 112 update module; the request may be based on a certain time period, by a certain time, by a date, on demand, or the like. In another example, the security management facility 122 and policy management facility 112 network servers 142 may push the information to the network of the enterprise facility 102 and/or client facility by providing notification that there are updates available for download and then transmitting the information.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by the security management facility 122 when scanning files or applications within the client facility for the determination of malicious code that may be within the file or application. The security management facility 122 may also be used to scan an outgoing file and verify that the outgoing file is permitted to be transmitted per the enterprise facility 102 rules and policies.

The threat management facility 100 may provide controlled access to the enterprise facility 102 networks. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the client facility or may be on another network. In an embodiment, the network access rules facility 124 may verify access rights for client facilities from within the network or may verify access rights of computer facilities from external networks. When network access for a client facility is denied, the network access rules facility 124 may send an information file to the client facility. For example, the information sent by the network access rules facility 124 to the client facility may be a data file. The data file may contain a number of commands, definitions, instructions, or the like, to be parsed and acted upon through the remedial action facility 128. The information sent by the network access facility rules facility 124 may be a command or command file that the remedial action facility 128 may access and take action upon.

The network access rules facility 124 may include databases such as a block list, a black list, an allowed list, a white list, an unacceptable network site database, an acceptable network site database, a network site reputation database, or the like of network access locations that may or may not be accessed by the client facility. The network access rules facility 124 may also or instead include rules, application logic or the like for controlling network access according to network policies and the like. The network access rule facility 124 may provide updated rules and policies to the enterprise facility 102.

When a threat or policy violation is detected by the threat management facility 100, the threat management facility 100 may perform or initiate a remedial action from the remedial action facility 128. Remedial action may take a plurality of forms, such as terminating or modifying an ongoing process or interaction, sending a warning to a client or to the administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to the administration facility 134, or the like.

Remedial action may be provided as a result of a detection of a threat or violation. The detection techniques facility 130 may monitor the enterprise facility 102 network or endpoint devices, such as by monitoring streaming data through the gateway, across the network, through routers and hubs, and the like. The detection techniques facility 130 may be used to monitor activity and stored files on computing facilities, such as on server facilities 142, desktop computers, laptop computers, other mobile computing devices, and the like.

The testing facility 118 may allow the administration facility 134 to coordinate testing of the security configurations of client facility computing facilities on a network. For example, the administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134.

The threat research facility 132 may provide a continuously ongoing effort to maintain the threat protection capabilities of the threat management facility 100 in light of continuous generation of new or evolved forms of malware. Threat research may include research by human researchers and analysts working on known and emerging malware, such as viruses, rootkits, spyware, as well as other computer threats such as phishing, spam, scams, and the like. Threat research may also or instead include automated detection of new or emerging malware threats and the like. In embodiments, through threat research, the threat management facility 100 may be able to provide swift, global responses to the latest threats.

The threat management facility 100 may provide threat protection to the enterprise facility 102 including networked components such as client facility, the server facility 142A, the administration facility 134, the firewall 138A, the network devices 148A-B (e.g., gateway, hubs and routers), the appliance 140 (e.g., threat management appliance), desktop users, mobile users, and the like. The endpoint computer security facility 152 located on a computer's desktop may also or instead provide threat protection to a user. The term endpoint, as used herein, may refer to a computer system that sources data, receives data, evaluates data, buffers data, or the like (such as a desktop computer, mobile device, server, or other computing device), a firewall as a data evaluation endpoint computer system, a laptop as a mobile endpoint computer, a personal digital assistant or tablet as a hand-held endpoint computer, a mobile phone as an endpoint computer, or the like. The term endpoint may also or instead refer to a source or destination for data.

The enterprise facility 102 may include a plurality of server facilities 142, such as application servers, communications servers, file servers, database servers, proxy servers, mail servers, fax servers, game servers, web servers, and the like. Each server facility 142, which may also be referred to as a server facility 142 application, server facility 142 operating system, server facility 142 computer, or the like, may be any application program or operating system that accepts client facility connections in order to service requests from clients 144. The server facility 142 application may run on the same computer as the client facility using it, or the server facility 142 and the client facility may be running on different computers and communicating across the network. Each server facility 142 may also be an appliance facility 140, where the appliance facility 140 provides specific services onto the network. Simple appliances of the server facility 142 may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

A client facility may be protected from threats from within the enterprise facility 102 network using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed.

Another component that may be protected by the endpoint computer security facility 152 is the network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a source with a low level of trust is the Internet 154, and more particularly, unknown sources of data on the Internet 154. A perimeter network forms a zone with an intermediate trust level situated between the Internet 154 and a trusted internal network. Since the firewall facilities 138 may represent boundaries between threat levels (corresponding to boundaries between different networks), the endpoint computer security facility 152 associated with a respective one of the firewall facilities 138 may provide resources that control the flow of threats at this entry point of the enterprise facility 102. Firewall facilities 138, and associated endpoint computer security facilities 152, may also be associated with a network node equipped for interfacing between networks that use different protocols. In embodiments, the endpoint computer security facility 152 may provide threat protection in a plurality of network infrastructure locations, such as at the enterprise facility 102 network entry point, examples of which include the firewall facility 138 or gateway, the server facility 142; distribution points within the network (e.g., the network devices 148), the desktop of client facility computers, and the like. In embodiments, the most effective location for threat detection may be at the endpoint computer security facility 152 associated with the user's computer desktop.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, automatic interactions between the enterprise facility 102 and the threat management facility 100 may be configured by the threat management facility 100 and the administration facility 134 in the enterprise facility 102. The administration facility 134 may configure policy rules that determine interactions, such as: developing rules for accessing applications, as in who is authorized and when applications may be used; establishing rules for ethical behavior and activities; rules governing the use of entertainment software such as games, or personal use software such as IM and VoIP; rules for determining access to computing resources of the enterprise facility 102, including authentication, levels of access, risk assessment, and usage history tracking; rules for when an action is not allowed, such as whether an action is completely deigned or just modified in its execution; and the like.

Client facilities within the enterprise facility 102 or outside of the enterprise facility 102 may be connected to the enterprise facility 102 network by way of wired network facilities 148A or wireless network facilities 148B, or any combination of these. Within areas exposed to the secondary location threats 108, there may be no endpoint computer security facilities at network components such as the firewalls 138B, the servers 142B, the clients 144G, the network devices 148C-D (e.g., hubs and routers), and the like. As a result, the computer components at such locations may be open to threat attacks, and may become potential sources of threats. Similarly, mobile enterprise facility clients 144B-F that may be connected to such locations may be open to threat attacks, and may become potential sources of threats. In this instance, these computer components may now unknowingly spread a threat to other components connected to the network, and it may be useful to track transitions into and of these secondary locations.

Having provided an overall context for threat detection, the description now turns to a description of an example of a computer system that may be used for any of the entities and facilities described above.

Figure 2:
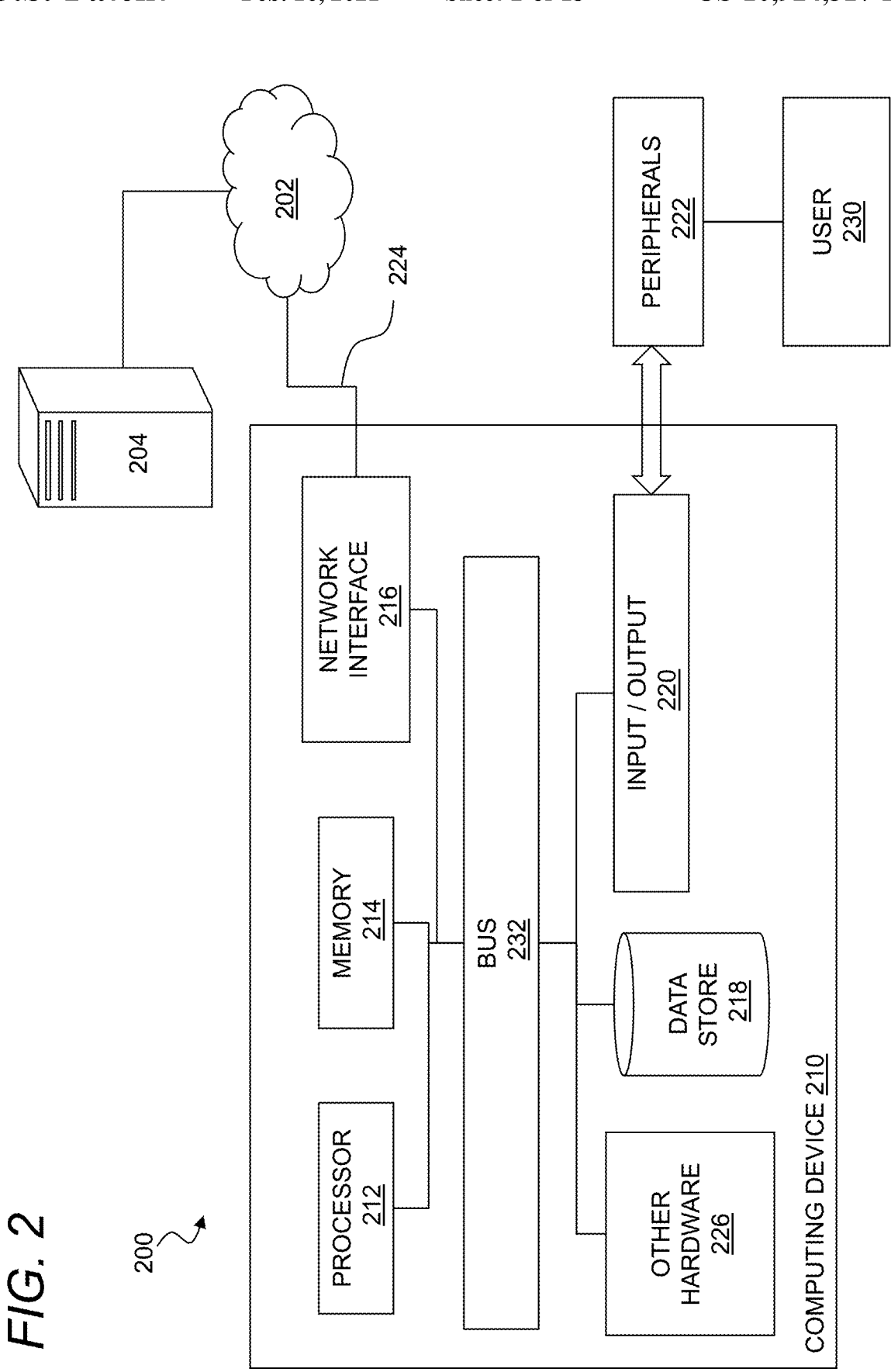
FIG. 2 illustrates an exemplary computer system.

FIG. 2 illustrates a computer system. In general, the computer system 200 may include a computing device 210 connected to a network 202, for example, through an external device 204. The computing device 210 may be or may include any type of network endpoint or endpoints as described herein such as, for example, the network endpoints described above with reference to FIG. 1. For example, the computing device 210 may include a desktop computer workstation. The computing device 210 may also or instead be any suitable device that has processes and communicates over the network 202 including, without limitation, a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may be used for any of the entities described in the threat management environment described above with reference to FIG. 1. For example, the computing device 210 may be a server, a client an enterprise facility, a threat management facility, or any of the other facilities or computing devices described therein. In certain aspects, the computing device 210 may be implemented using hardware (e.g., in a desktop computer), software (e.g., in a virtual machine or the like), or a combination of software and hardware, and the computing device 210 may be a standalone device, a device integrated into another entity or device, a platform distributed across multiple entities, or a virtualized device executing in a virtualization environment.

The network 202 may include any network described above, e.g., data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and in general may be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor (e.g., the processor 212) may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question (e.g., code that constitutes processor firmware, a protocol stack, a database management system, an operating system, or a combination of the foregoing, and/or code that performs some or all of the steps set forth in the various flow charts and other algorithmic descriptions set forth herein). While the memory 214 is depicted as a single memory, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources and, thus, may typically include one or more communication channels 224 and be connected to one or more networks (e.g., the network 202). By way of example and not limitation, this may include electronics for wired or wireless transmission of information over the network 202 either wirelessly or through a physical connection, depending on the needs of a specific implementation. As an example, the communication may be via an Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store without limitation one or more of the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

A peripheral 222 may include any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control or communication to other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., BlueTooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as the peripheral 222 as contemplated herein.

Other hardware 226 may be incorporated into the computing device 200. Examples of the other hardware 226 include a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200, such as the processor 212, the memory 214, the network interface 216, the other hardware 226, the data store 218, and an input/output interface. As shown in the figure, each of the components of the computing device 210 may be interconnected using the bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
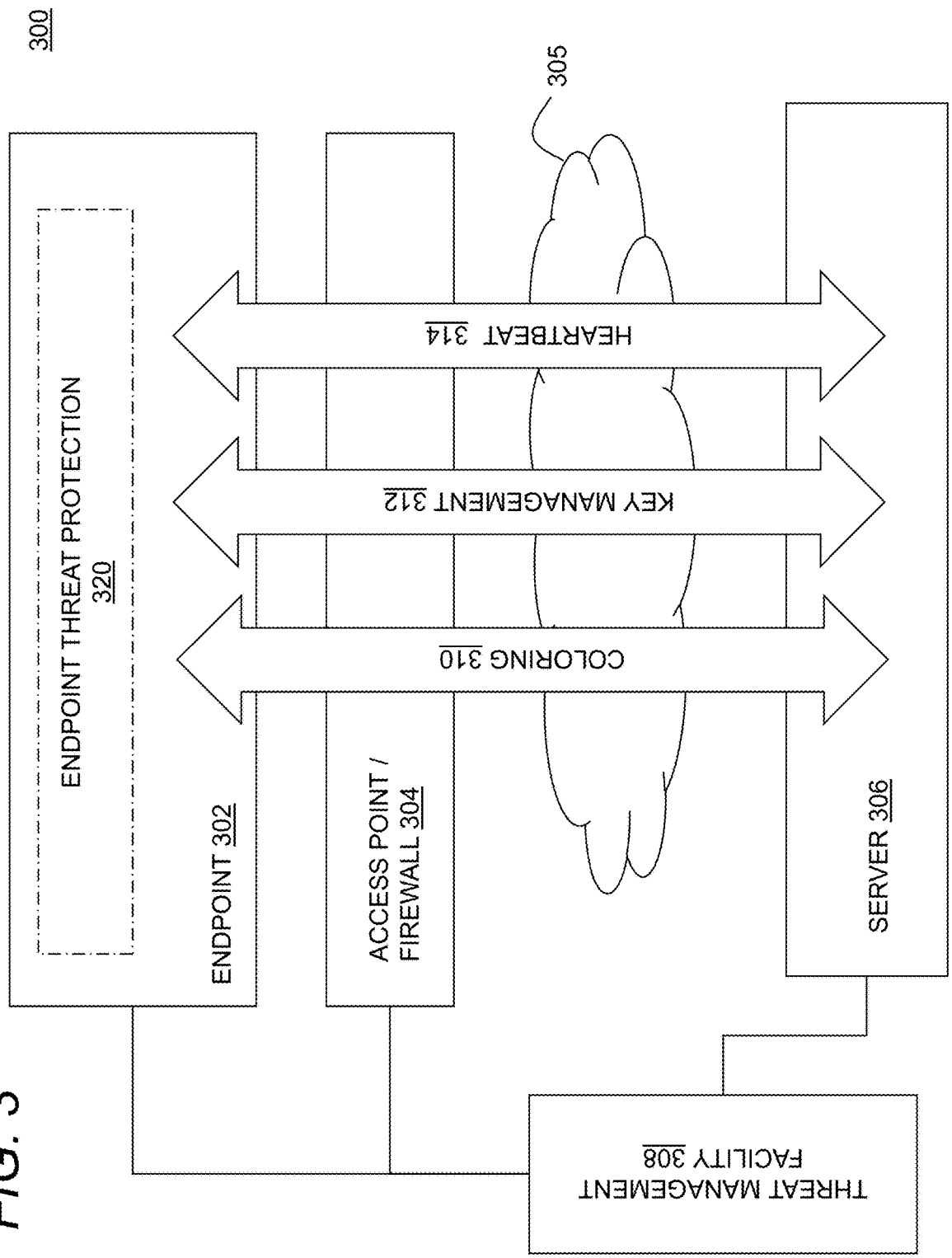
FIG. 3 illustrates a threat management system.

FIG. 3 illustrates an exemplary threat management system 300 as contemplated herein. In general, the threat management system may include an endpoint 302 for example, a laptop, or a device such as an IoT device, an access point 304, a server 306 and a threat management facility 308 in communication with one another directly or indirectly through a data network 305, for example, as generally described above. Each of the entities depicted in FIG. 3, may, for example, be implemented on one or more computing devices such as the computing device described above with reference to FIG. 2.

A number of systems may be distributed across these various components to support threat management, for example, including a coloring system 310, a key management system 312 and a heartbeat system 314, each of which may include software components executing on any of the foregoing system components, and each of which may communicate with the threat management facility 308 or an endpoint threat protection agent 320 executing on an endpoint 302, on an access point or a firewall 304, or on a server 306 to support improved threat detection and remediation.

The coloring system 310 may be used to label or 'color' software objects for improved tracking and detection of potentially harmful activity. The coloring system 310 may, for example, label files, executables, processes, network communications, data sources and so forth with any suitable label. A variety of techniques may be used to select static and/or dynamic labels for any of these various objects, and to manage the mechanics of applying and propagating coloring information as appropriate. For example, a process may inherit a color from an application that launches the process. Similarly, a file may inherit a color from a device when it is created or opened by a device, and/or a process may inherit a color from a file that the process has opened. More generally, any type of labeling, as well as rules for propagating, inheriting, changing, or otherwise manipulating such labels, may be used by the coloring system 310 as contemplated herein. A color may be or may be based on one or more reliability index values, the meeting of one or more reliability index thresholds, the rate of change of one or more reliability index values, etc. A color of a device may be used in a security policy. A color of a process, a file, a network request, and so on may be based on a color of a device, and that color may be used in a security policy.

The key management system 312 may support management of keys for the endpoint 302 in order to selectively permit or prevent access to content on the endpoint 302 on a file-specific basis, a process-specific basis, an application-specific basis, a user-specific basis, or any other suitable basis in order to prevent data leakage, and in order to support more fine-grained and immediate control over access to content on the endpoint 302 when a security compromise is detected. Thus, for example, if a particular process executing on the endpoint is compromised, or potentially compromised or otherwise under suspicion, keys to that process may be revoked in order to prevent, for example, data leakage or other malicious activity. In embodiments, keys on device may be revoked based on one or more reliability index values, the meeting of one or more reliability index thresholds, the rate of change of one or more reliability index values, etc.

The heartbeat system 314 may be used to provide periodic or aperiodic information from an endpoint about system health, security, status, etc. A heartbeat may be encrypted or plaintext, or some combination of these, and may be communicated unidirectionally (e.g., from the endpoint 302 to the threat management facility 308) or bidirectionally (e.g., between the endpoint 302 and the server 306, or any other pair of system components) on a useful schedule.

In implementations, the access point or firewall 304 may use the heartbeat 314 to report a potential or actual compromise of a device based, for example, on a color of the device, or based on one or more reliability index values, the meeting of one or more reliability index thresholds, the rate of change of one or more reliability index values, etc. The heartbeat 314 from the access point 304 may be communicated to the server 306, for example, and administrative server or directly or indirectly to a threat management facility 308. If the endpoint device 302 has an endpoint threat protection facility 320, the endpoint threat protection facility 320 may be used to investigate further the status, or to take remedial measures, again by communication using the secure heartbeat 314.

In general, these various monitoring and management systems may cooperate to provide improved threat detection and response. For example, the coloring system 310 may be used to evaluate when a particular device is potentially compromised, and a potential threat may be confirmed based on an interrupted heartbeat from the heartbeat system 314 or by information communicated in a heartbeat. The key management system 312 may then be used to revoke keys to a process so that no further files can be opened, deleted or otherwise modified. More generally, the cooperation of these systems enables a wide variety of reactive measures that can improve detection and remediation of potential threats to an endpoint.

Figure 4:
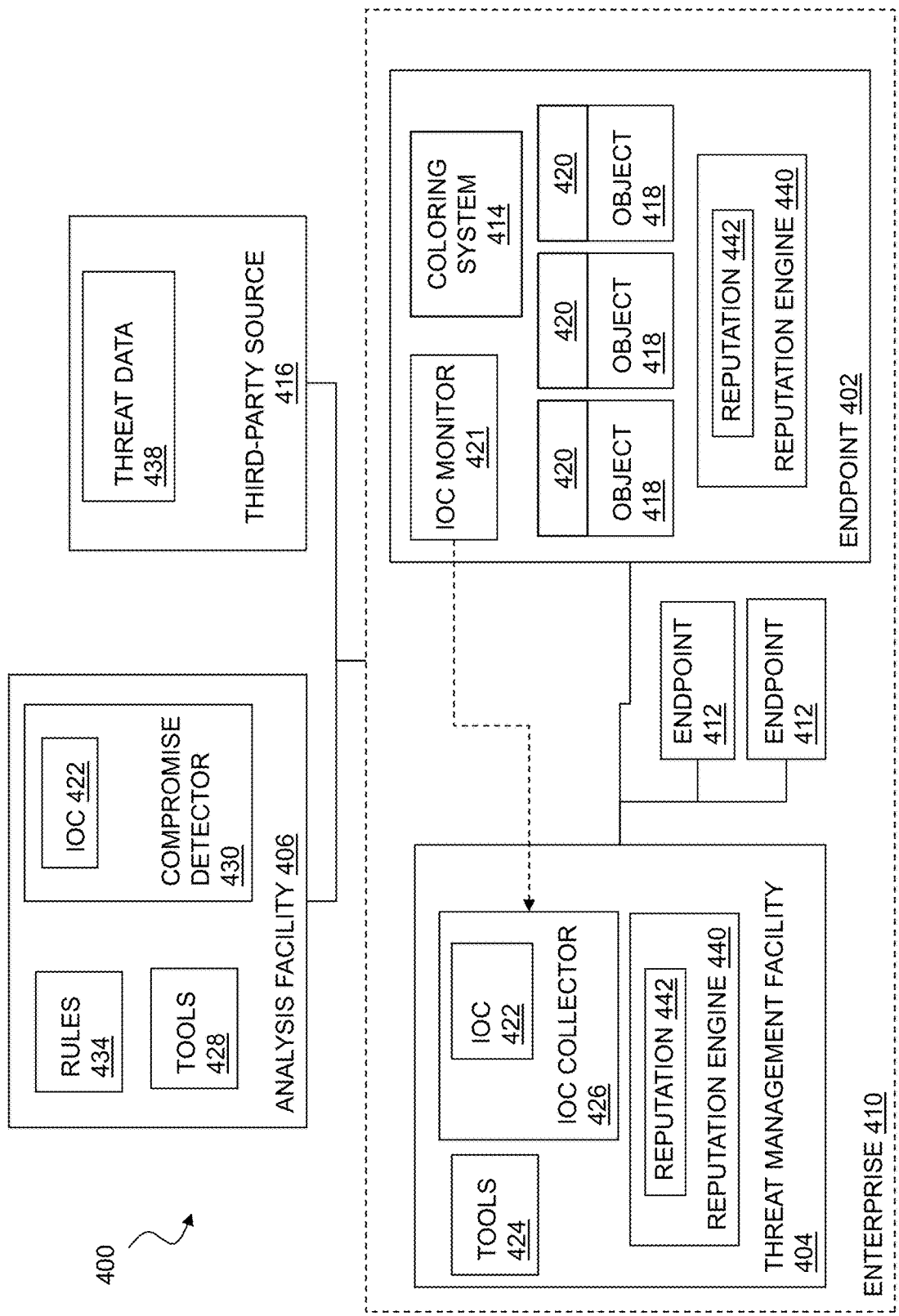
FIG. 4 illustrates a system for behavioral tracking, coloring, and generation of indications of compromise (IOCs).

FIG. 4 illustrates a system for behavioral tracking, coloring, and generation of indications of compromise (IOCs). In general, the system 400 may include a number of entities participating in a threat management process such as any of the entities and threat management processes described herein. The threat management process may for example employ techniques such as behavioral tracking, encryption, endpoint recording, reputation-based threat detection, behavioral-based threat detection, signature-based threat detection, and combinations of the foregoing, or any other suitable techniques for detecting threats to endpoints in an enterprise.

In general, the system 400 may include a number of endpoints 402, 412 and a threat management facility 404 in an enterprise 410, such as any of the enterprises described above. An external analysis facility 406 may analyze threat data and provide rules and the like for use by the threat management facility 404 and endpoints 402, 412 in managing threats to the enterprise 410. The threat management facility 404 may reside in a local appliance (e.g., embedded within, or locally coupled to the endpoint 402), a virtual appliance (e.g., which could be run by a protected set of systems on their own network systems), a private cloud, a public cloud, and so forth. The analysis facility 406 may store locally-derived threat information. The analysis facility 406 may also or instead receive threat information from a third-party source 416 such as MITRE Corporation or any other public, private, educational or other organization that gathers information on network threats and provides analysis and threat detection information for use by others. Each of these components may be configured with suitable programming to participate in the various threat detection and management techniques contemplated herein. The threat management facility 404 may monitor any stream of data from an endpoint 402 exclusively, or use the full context of intelligence from the stream of all protected endpoints 402, 412 or some combination of these.

The endpoint 402 may be any of the endpoints described herein, or any other device or network asset that might join or participate in the enterprise 410 or otherwise operate on an enterprise network. This may, for example, include a server, a client such as a desktop computer or a mobile computing device (e.g., a laptop computer or a tablet), a cellular phone, a smart phone, or other computing device suitable for participating in the enterprise 410.

In general, the endpoint 402 may include any number of computing objects such as an object 418 labeled with a descriptor 420. While the term object has a number of specific meanings in the art, and in particular in object-oriented programming, it will be understood that the term 'object' as used herein is intended to be significantly broader, and may include any data, process, file or combination of these including without limitation any process, application, executable, script, dynamic linked library, file, data, database, data source, data structure, function, resource locator (e.g., uniform resource locator (URL) or other uniform resource identifier (URI)), or the like that might be manipulated by one of the computing devices described herein.

An object 418 may also or instead include a remote resource, such as a resource identified in a URL. That is, while the objects 418 in FIG. 4 are depicted as residing on the endpoint 402, an object 418 may also reside elsewhere in the system 400, while still being labeled with a descriptor 420 and tracked by the monitor 421 of the endpoint 402. The object 418 may be an item that is performing an action or causing an event, or the object 418 may be an item that is receiving the action or result of an event (i.e., the item in the system 400 being acted upon).

Where the object 418 is data or includes data, the object 418 may be encrypted or otherwise protected, or the object 418 may be unencrypted or otherwise unprotected. The object 418 may be a process or other computing object that performs an action, which may include a single event or a collection or sequence of events taken by a process. The object 418 may also or instead include an item such as a file or lines of code that are executable to perform such actions. The object 418 may also or instead include a computing component upon which an action is taken, e.g., a system setting (e.g., a registry key or the like), a data file, a URL, or the like. The object 418 may exhibit a behavior such as an interaction with another object or component of the system 400.

In one aspect, objects 418 may be described in terms of persistence. The object 418 may, for example, be a part of a process, and remain persistent as long as that process is alive. The object 418 may instead be persistent across an endpoint 402 and remain persistent as long as an endpoint 402 is active or alive. The object 418 may instead be a global object having persistence outside of an endpoint 418, such as a URL or a data store. In other words, the object 418 may be a persistent object with persistence outside of the endpoint.

Although many if not most objects 418 will typically be benign objects forming a part of a normal, operating endpoint, an object 418 may contain software associated with an advanced persistent threat (APT) or other malware that resides partially or entirely on the endpoint 402. The associated software may have reached the endpoint 402 in a variety of ways, and may have been placed manually or automatically on the endpoint 402 by a malicious source. It will be understood that the associated software may take any number of forms and have any number of components. For example, the associated software may include an executable file that can execute independently, or the associated software may be a macro, plug-in, or the like that executes within another application. Similarly, the associated software may manifest as one or more processes or threads executing on the endpoint 402. Further, the associated software may install from a file on the endpoint 402 (or a file remote from the endpoint 402), and the associated software may create one or more files such as data files or the like while executing. Associated software should be understood to generally include all such files and processes except where a specific file or process is more specifically noted.

A threat such as an APT may also take the form of an attack where no altered or additional software is directly added or modified on the endpoint 402. Instead, an adversary may reuse existing software on the system 400 to perform the attacks. It is for this reason that simply scanning for associated software may be insufficient for the detection of APTs and it may be preferably to detect APTs based on the behavior of the software and associated objects 418 that are used by, for, and with that software.

An object coloring system 414 may apply descriptors 420 to objects 418 on the endpoint 402. This may be performed continuously by a background process on the endpoint 402, or it may occur whenever an object 418 is involved in an action, such as when a process makes a call to an application programming interface (API) or takes some other action, or when a URL is used to initiate a network request, or when a read or a write is performed on data in a file. This may also or instead include a combination of these approaches as well as other approaches, such as by pre-labeling a file or application when it is moved to the endpoint 402, or when the endpoint 402 is started up or instantiated. In general, the object coloring system 414 may add, remove or change a color at any location and at any moment that can be practicably instrumented on a computer system.

As noted above, the term 'object' as used herein is intended to include a wide range of computing objects and as such, the manner in which particular objects 418 are labeled or 'colored' with descriptors 420 may vary significantly. Any object 418 that is performing an action (such as a process or application) may be colored at the time of and/or with a label corresponding to the action, or likewise any object 418 that is the target of the action (such as a file or other data) may be colored at the time that it is used and/or with a label corresponding to a process or the like using the object 418. Furthermore, the operating system runtime representation of the object 418 may be colored, or the persistent object outside of the operating system may be colored (as is the case for a File Handle or File Object within the operating system or the actual file as stored in a file system), such as within an encryption header or other header applied to the file, or as part of a directory attribute or any other persistent location within the file or file system. A former coloring may be ephemerally tracked while the operating system maintains the representation and the latter may persist long after any reboots of the same operating system and likewise have meaning when read or used by other endpoints 402. For processes, each file handle may be supplemented with a pointer or other mechanism for locating a descriptor 420 for a particular object 420 that is a process. More specifically, each object 418 may be colored in any manner suitable for appending information to that object 418 so that the corresponding descriptor 420 can be retrieved and, where appropriate, updated.

The coloring system 414 may apply any suitable rules for adding and changing descriptors 420 for objects 418. For example, when a process with a certain descriptor accesses data with a different descriptor, the descriptor for the process may be updated to correspond to the data, or the descriptor for the data may be updated to correspond to the process, or some combination of these. Any action by or upon an object 418 may trigger a coloring rule so that descriptors 420 can be revised at any relevant time(s) during processing.

In one aspect, colors will not explicitly indicate a compromised security state or other good/bad types of distinctions (although they may be adapted to this use). Instead, colors may record some known information or understanding about an object 418, such as a source, a purpose, and so forth. In this context, colors will not be used to label actual or potential security compromises, but to identify inconsistencies among interacting objects 418, and to restrict or control access and use accordingly. For example, where an endpoint uses file-system-based encryption as described herein, a process that is colored as exposed to external resources (e.g., the Internet) may be prohibited from accessing cleartext data for protected files. Colors can also be used in other contexts such as intrusion prevention, routing rules, and detection of odd or questionable behavior.

In one aspect, colors may be implemented as flags associated with objects 418 that provide a short hand cache of potentially relevant information. While this information could also be obtained for an object 418 through a careful inspection of related activity logs or other data recording activities, the use of a cache of flags for coloring information makes the coloring information directly available and immediately actionable, as distinguished from post hoc forensic activities that are otherwise supported by data logging.

In one aspect, colors as contemplated herein may fall into two different categories: static colors and dynamic colors. Static colors may be explicitly applied based on, e.g., a controlling application. For example, a static color may specify a status of an application or data, or an associated type of application (e.g., productivity, mail client, messaging, browser, word processing, financial, spreadsheet, etc.). In this context, a process will generally inherit static colors from a source executable, and will permit inferences for appropriate behavior and related processes. Dynamic colors may be assigned based on direct observation of executing processes, and may not be inherited or transferred among processes (although the presence of a dynamic color may be used to draw another coloring inference upon interaction with another process). Thus, the inheritance of colors may depend in part upon the type of color that is applied, or upon explicit inheritance rules provided for a particular color.

A descriptor 420 used for coloring as contemplated herein may take a variety of forms, and may in general include any information selected for relevance to threat detection. This may, for example, be a simple categorization of data or processes such as trusted or untrusted. For example, in one embodiment described herein, data and processes are labeled as either 'IN' (e.g., trusted) or 'OUT' (e.g., untrusted). The specific content of the label is unimportant, and this may be a binary flag, text string, encrypted data or other human-readable and/or machine-readable identifier, provided that the descriptor 420 can facilitate discrimination among labeled files—in this example, between trusted objects 418 and untrusted objects 418 so that, e.g., trusted data can be selectively decrypted or encrypted for use with trusted processes. Similarly, data may be labeled as corporate data or private data, with similar type-dependent processing provided. For example, private data may be encrypted with a key exclusively controlled by the data owner, while corporate data may be encrypted using a remotely managed key ring for an enterprise operated by the corporation.

In another aspect, the descriptor 420 may provide a multi-tiered or hierarchical description of the object 418 including any information useful for characterizing the object 418 in a threat management context. For example, in one useful configuration the descriptor 420 may include a type or category, static threat detection attributes, and an explicit identification. The type or category for the object 418 may be any category or the like that characterizes a general nature or use of the object 418 as inferred from behavior and other characteristics. This may, for example, include categories such as 'game,' 'financial,' 'application,' 'electronic mail,' 'image,' 'video,' 'browser,' 'antivirus,' and so forth. The category may be more granular, or may include hierarchical categories such as 'application:spreadsheet,' 'application:word_processing,' and so forth. Such colors may be directly inferred from a single action, a sequence of actions, or a combination of actions and other colors, including, e.g., colors of processes and files related to a particular action, or other objects 418 that provide context for a particular action or group of actions. One or more colors may also or instead be explicitly provided by a user or a process, or otherwise automatically or manually attributed to computer objects as contemplated herein.

The static threat detection attributes may be any readily ascertainable characteristics of the object 418 useful in threat detection. This may, for example, include an antivirus signature, a hash, a file size, file privileges, a process user, a path or director, and so forth. Static threat detection attributes may also include attributes that are derived by or supplied from other sources. For example, static threat detection attributes may include a reputation for an object 418, which may be expressed in any suitable or useful level of granularity such as with discrete categories (trusted/untrusted/unknown) or with a numerical score or other quantitative indicator. The explicit identification may, in general, be what an object 418 calls itself, e.g., a file name or process name.

Some actions may transfer colors from the subject of the action to the target of the action. For example, when a process creates sub-processes, the sub-processes may inherit the colors of its parent(s). By way of another example, when a process is initially loaded from an executable, it may inherit the color(s) stored in the file system for or with the executable.

In general, the descriptor 420 may be provided in any suitable format. The descriptor 420 may for example be formed as a vector of binary flags or other attributes that form the 'color' or description of an object 418. The descriptor 420 may also, where appropriate, include scalar quantities for certain properties. For example, it may be relevant how many times a system file was accessed, how many file handles a process has opened, how many times a remote resource was requested or how long a remote resource is connected, and this information may be suitably encoded in the descriptor 420 for use in coloring objects with the coloring system 414 and applying rules for IOC detection by the IOC monitor 421.

An indication of compromise (IOC) monitor 421 may be provided to instrument the endpoint 402 so that any observable actions by or involving various objects 418 can be detected. As with the coloring system 414, it will be understood that the types of observable actions will vary significantly, and the manner in which the endpoint 402 is instrumented to detect such actions will depend on the particular type of object 418. For example, for files or the like, an API for a file system may be used to detect reads, writes, and other access (e.g., open, read, write, move, copy, delete, etc.), and may be configured to report to or otherwise initiate monitoring of the action taken with the file through the file system. As another example, kernel objects may be instrumented at the corresponding object handle or in some other manner. As a further example, a kernel driver may be used for intercepting a process startup. While a wide variety of objects are contemplated herein, one of ordinary skill in the art may readily create suitable instrumentation for any computing object so that it may be monitored by the IOC monitor 421.

It will be noted that suitable instrumentation may be coded for a variety of functions and circumstances. For example, instrumentation may usefully track requests for network access or other actions back to a particular application or process, or data payloads back to a particular file or data location. One of ordinary skill in the art can readily implement suitable traces and/or logging for any such information that might be useful in a particular IOC monitoring operation.

In general, the IOC monitor 421 applies rules to determine when there is an IOC 422 suitable for reporting to a threat management facility 404. It will be understood that an endpoint 402 may, in suitable circumstances and with appropriate information, take immediate local action to remediate a threat. However, the monitor 421 may advantageously accumulate a sequence of actions, and still more advantageously may identify inconsistencies or unexpected behavior within a group of actions with improved sensitivity by comparing descriptors 420 for various objects 418 involved in relevant actions and events. In this manner, rules may be applied based upon the descriptors 420 that better discriminate malicious activity while reducing the quantity and frequency of information that must be communicated to a remote threat management facility 404. At the same time, all of the relevant information provided by the descriptors 420 can be sent in an IOC 422 when communicating a potential issue to the threat management facility 404. For example, during the course of execution, a specific process (as evidenced by its observed actions) may be assigned color descriptors indicating that it is a browser process. Further, the specific process may be assigned an attribute indicating that it has exposed itself to external URLs or other external data. Subsequently, the same process may be observed to be taking an action suitable for an internal or system process, such as opening up shared memory to another process that has coloring descriptions indicating that it is a system process. When this last action is observed, an inconsistency in the various color descriptors between the subject of the action—the externally exposed browser process—and the target of the action may result in a well-defined IOC, which may be directly processed with immediate local action taken. The IOC may also or instead be reported externally as appropriate.

Thus, an endpoint 402 in an enterprise 410 may be instrumented with a coloring system 414 and monitor 421 to better detect potentially malicious activity using descriptors 420 that have been selected for relevance to threat detection along with a corresponding set of rules developed for the particular descriptors 420 that are being used to label or color various objects 418. By way of example, the object 418 may be a web browser that starts off being colored as a 'browser' and an 'internet facing' application. Based on this descriptor 420, a range of behaviors or actions may be considered normal, such as accessing remote network resources. However, if an object 418 colored with this descriptor 420 attempted to elevate privileges for a process, or to access a registry or system files, then this inconsistency in action may trigger a rule violation and result in an IOC 422.

In general, any action or series of actions that cumulatively invoke a particular reporting or action rule may be combined into an IOC 422 and communicated to the threat management facility 404. For example, an IOC 422 may include a malicious or strange behavior, or an indication of a malicious or strange behavior. The IOC 422 may be a normalized IOC that expresses one or more actions in a platform independent manner. That is, the IOC 422 may express a malicious behavior or suspected malicious behavior without reference to platform-specific information such as details of an operating system (e.g., iOS, MacOS, Windows, Android, Linux, and so forth), hardware, applications, naming conventions, and so forth. Thus, a normalized IOC may be suitable for identifying a particular threat across multiple platforms, and may include platform independent processes, actions, or behaviors, or may express such process, actions, or behaviors in a platform independent manner. The normalized IOC may be generated from the IOC 422, e.g., it may be a converted version of the IOC 422 suitable for use with multiple platforms, or it may simply be any IOC 422 that has been created in a platform independent form. Process colorization (i.e., using the coloring system 414) as described herein may be used to create a normalized IOC.

In general, a threat management facility 404 for the enterprise 410 may include an IOC collector 426 that receives the IOC 422 from the endpoint 402 and determines an appropriate action. This may include any suitable remedial action, or where one or more IOCs 422 are inconclusive, continued monitoring or increased monitoring as appropriate.

The threat management facility 404 may provide a variety of threat management or monitoring tools 424, any of which may be deployed in response IOCs 422 collected by the IOC collector 426. These tools 424 may include without limitation a scanning engine, whitelisting/blacklisting, reputation analysis, web filtering, an emulator, protection architecture, live protection, runtime detection, APT detection, network antivirus products, IOC detection, access logs, a heartbeat, a sandbox or quarantine system, and so forth.

The analysis facility 406 may provide a remote processing resource for analyzing malicious activities and creating rules 434 suitable for detecting IOCs 422 based on objects 420 and descriptors 420. It is generally contemplated that suitable attributes of certain descriptors 418 and one or more rules 434 may be developed together so that objects 418 can be appropriately labeled with descriptors 420 that permit invocation of rules 434 and creation of IOCs 422 at appropriate times. The analysis facility 406 may include a variety of analysis tools 428 including, without limitation, tools for regular expression, whitelisting/blacklisting, crowd sourcing, identifiers, and so forth. The analysis tools 428 may also or instead include information and tools such as URL look-ups, genotypes, identities, file look-up, reputations, and so forth. The analysis facility 406 may also provide numerous related functions such as an interface for receiving information on new, unknown files or processes, and for testing of such code or content in a sandbox on the analysis facility 406.

The analysis facility 406 may also or instead include a compromise detector 430, where the compromise detector 430 is configured to receive new threat information for analysis and creation of new rules and descriptors as appropriate, as well as corresponding remedial actions. The compromise detector 430 may include any tools described herein or otherwise known in the art for detecting compromises or evaluating new threats in an enterprise 410.

In general, a rule 434 may be manually created with corresponding human-readable semantics, e.g., where a process is labeled as a browser process or other category or type that can be interpreted by a human. It should, however, be appreciated that the compromise detector 430 may also be configured to automatically generate descriptors 420 and rules 434 suitable for distribution to a threat management facility 404 and an endpoint 402. In this latter mode, the meaning of a particular descriptor 420 may not have a readily expressible human-readable meaning. Thus, it will be understood that attributes selected for relevance to threat detection may include conventional attributes, as well as attributes without conventional labels or meaning except in the context of a particular, computer-generated rule for threat detection.

In general, the analysis facility 406 may be within an enterprise 410, or the analysis facility 406 may be external to the enterprise 410 and administered, for example, by a trusted third party. Further, a third-party source 416 may provide additional threat data 438 or analyses for use by the analysis facility 406 and the threat management facility 404. The third-party resource 416 may be a data resource that provides threat data 438 and analyses, where the threat data 438 is any data that is useful in detecting, monitoring, or analyzing threats. For example, the threat data 438 may include a database of threats, signatures, and the like. By way of example, the third-party resource 416 may be a resource provided by The MITRE Corporation.

The system 400 may include a reputation engine 440 storing a plurality of reputations 442. The reputation engine 440 may include a reputation management system for the generation, analysis, identification, editing, storing, etc., of reputations 442. The reputation engine 440 may include reputation-based filtering, which may be similar to the reputation filtering discussed above with reference to FIG. 1. The reputation engine 440 may be located on the threat management facility 404 or the endpoint 402 as shown in FIG. 4, or the reputation engine 440 may be located elsewhere in the system 400. The reputation engine 440 may receive an IOC 422 or a stream of IOCs 422, and may generate or utilize reputations 442 for the IOCs 422. The reputation engine 440 may also or instead receive actions, behaviors, events, interactions, and so forth, and may generate or utilize reputations 442 for any of the foregoing. The reputation engine 440 may generate or revise a reputation 442 based on behaviors, actions, events, interactions, IOCs 422, other reputations 442, a history of events, data, rules, state of encryption, colors, and so forth. The reputation engine 440 may utilize a third-party resource, e.g., for the third-party resource's reputation data.

The reputations 442 may include reputations for any of the objects 418 as described herein. In general, the reputations 442 may relate to the trustworthiness of the objects 418 or an attribute thereof (e.g., the source of the object 418, a behavior of the object 418, another object interacting with the object 418, and so forth). The reputations 442 may include lists of known sources of malware or known suspicious objects 418. The reputations 442 may also or instead include lists of known safe or trusted resources or objects 418. The reputations 442 may be stored in a reputations database included on the reputation engine 440 or located elsewhere in the system 400. The reputations 442 may be expressed in any suitable or useful level of granularity such as with discrete categories (e.g., trusted, untrusted, unknown, malicious, safe, etc.) or with a numerical score or other quantitative indicator. The reputations 442 may also be scaled.

In general, in the system 400 of FIG. 4, a malicious activity on the endpoint 402 may be detected by the IOC monitor 421, and a corresponding IOC 422 may be transmitted to the threat management facility 404 for remedial action as appropriate. The threat management facility 404 may further communicate one or more IOCs 422 to the analysis facility 406 for additional analyses and/or resolution of inconclusive results. Other details and variations are provided below. While the use of coloring and IOCs as contemplated herein can improve threat detection and remediation in a number of ways, the system 400 can be further improved with granular control over access to endpoint data using an encryption system. A system for key-based management of processes and files on an endpoint is now discussed in greater detail.

Figure 5:
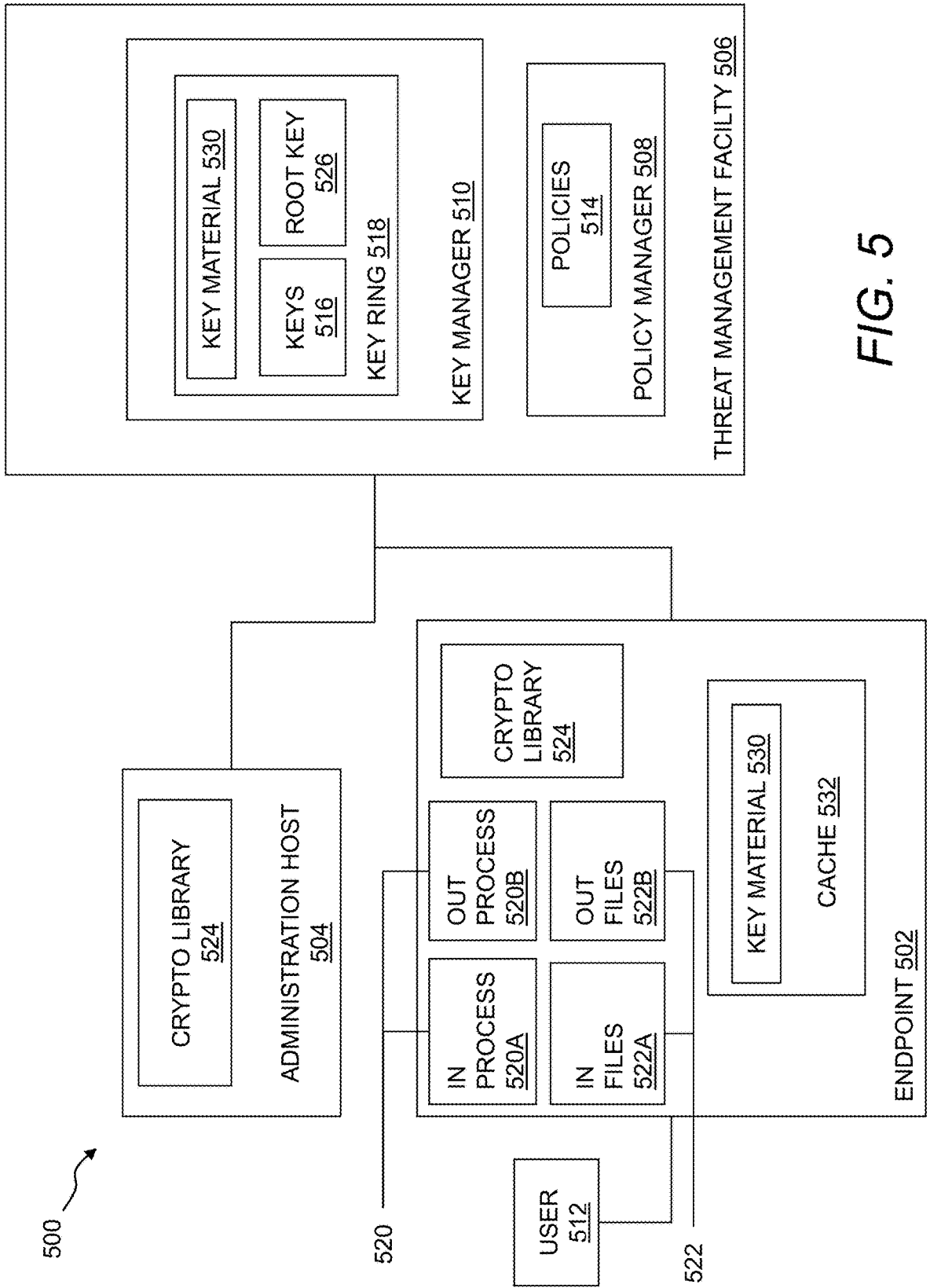
FIG. 5 illustrates a system for encryption management.

FIG. 5 illustrates a system for encryption management. Generally, the system 500 may include endpoints 502, an administration host 504, and a threat management facility 506, which may include policy manager 508 and key manager 510. The system 500 may provide for the management of users 512, policies 514, keys 516 (e.g., disposed on key rings 518), and endpoints 502 (e.g., from the administration host 504). The system 500 may utilize various storage and processing resources, which may be disposed in a cloud or the like.

The endpoints 502 may be any of the endpoints as described herein, e.g., with reference to the other figures. The endpoints 502 may also or instead include other end user devices and other devices to be managed. The endpoints 502 may include a web browser for use by the users 512, with supporting cryptographic functions implemented using cryptographic libraries in the web browser. The endpoints 502 may communicate with the other components of the system 500 using any suitable communication interface, which may include Secure Socket Layer (SSL) encryption, Hypertext Transfer Protocol Secure (HTTPS), and so forth for additional security.

The endpoints 502 may include objects as described herein. For example, the endpoints 502 may include processes 520 and files 522. The processes 520 may be labeled (e.g., by a coloring system using descriptors as described above) in such a manner that the process is 'IN,' where the process 520 is in compliance with policies 514 administered for the endpoint 502 from a remote threat management facility 506, or the process is 'OUT,' where the process 520 is out of compliance with a policy (or a number of policies) in the policies 514 for an enterprise. This may provide IN processes 520A and OUT processes 520B as shown in FIG. 5. The files 522 may be similarly labeled by a coloring system with descriptors that identify each file 522 as IN, where the file 522 complies with the policies 514 and is accordingly encrypted using, e.g., a remotely managed key ring 518, or the file is OUT, where the file 522 does not conform to the policies 514 and is accordingly not encrypted using the remotely managed key ring 518. This may provide IN files 522A and OUT files 522B as shown in FIG. 5. One skilled in the art will recognize that other objects of the endpoint 502 or other components of the system 500 may be labeled in a similar manner where they are either IN or OUT. By coloring objects in this manner and basing key access on the corresponding color, the "IN" software objects may operate in a protected environment that objectively appears to be in compliance with the policies 514. Other files and processes may still be used on the endpoint 502, but they will operate in an "OUT" or unprotected environment that cannot obtain access to any of the "IN" content or functionality.

In an implementation, the system 500 may include determining whether an endpoint 502 is IN or OUT or whether a component of the endpoint 502 is IN or OUT, which may be based upon a set of rules (e.g., the rules outlined herein) or policies such as the policies 514 described herein. In some aspects, if the entire endpoint 502 is OUT—that is, out of compliance with one or more policies 514, the endpoint 502 will not have key access or access to any protected content. Conversely, if the endpoint 502 is IN, the endpoint 502 may have access to protected content. Thus, in one aspect, the notion of IN/OUT may be applied at an endpoint level, and data protection may be a consequence of endpoint protection. Endpoint protection may also or instead be applied at a more granular level, e.g., by determining whether executables, processes 520, files 522, etc., on the endpoint 502 are IN or OUT, which may be based upon rules or policies 514 as described herein.

The administration host 504 may include a web browser, which may include a cryptography library 524 and a web user interface (e.g., HTML, JavaScript, etc.). An administrator may utilize the web user interface to administer a key management system and perform administrative functions such as creating and distributing keys 516, establishing security policies, creating key hierarchies and rules, and so forth. The endpoint 502 may also include a cryptographic library 524 implementing cryptographic protocols for using key material in the key ring 518 to encrypt and decrypt data as needed.

The threat management facility 506 may include any of the threat management facilities or similar systems described herein. In general, the threat management facility 506 may include a policy manager 508 and key manager 510. Alternatively, one or more of the policy manager 508 and key manager 510 may be located elsewhere on a network.

The policy manager 508 may implement one or more policies 514, and maintain, distribute, and monitor the policies for devices in an enterprise. The policies 514 may include any policies 514 relating to secure operation of endpoints 502 in an enterprise. This may, for example, include hardware configuration policies, software configuration policies, communication policies, update policies, or any other policies relating to, e.g., the configuration of an endpoint 502, communications by an endpoint 502, software executing on an endpoint 502 and so forth. Policies 514 may include usage criteria based on, e.g., signatures, indications of compromise, reputation, user identity, and so forth. With respect to the key management system contemplated herein, the policies 514 may include a cryptographic protocol design, key servers, user procedures, and other relevant protocols, or these cryptographic protocols may be provided elsewhere for use by the policy manager 508. The policies 514 may also include any rules for compliance including those mentioned above or any other suitable rules or algorithms that can be applied to determine whether objects and components are 'IN' or 'OUT' as contemplated herein.

The key manager 510 may be part of the threat management facility 506, or it may be remotely managed elsewhere, e.g., in a remote cloud resource or the like. The key manager 510 may also or instead be disposed on the administration host 504 and one or more endpoints 502 in a manner independent of the threat management facility 506. In this manner, all cryptographic operations may be isolated from the threat management facility 506 and instead may be performed by a web browser or the like executing on the administration host 504 or an endpoint 502. The key manager 510 may manage the keys 516, including managing the generation, exchange, storage, use, and replacement of keys 516. The key manager 510 may include a key ring 518, where the keys 516 are disposed on the key ring 518 using one root key 526. The key manager 510 may also or instead include a variety of key management and other secure processes, including without limitation, administrator registration, establishing trust to endpoints 502, key distribution to endpoints 502, policy deployment, endpoint status reporting, and local key backup.

The users 512 may have full access to encrypted data. Alternatively, the users 512 may have limited access to encrypted data, or no access to encrypted data. Access may be limited to users 512 using endpoints 502 that are deemed 'IN' by the system, as well as to processes 520 that are IN, as further described herein.

The keys 210 may include cryptographic keys in a cryptosystem, i.e., decryption keys. In one aspect, the keys 210 may be disposed on one key ring 218 using one root key 220. In general, the keys 210 may be created and managed using, e.g., symmetric key technology, asymmetric key technology, or any other key technology or combination of key technologies suitable for securing data in an enterprise including, for example the Data Encryption Standard (DES), Triple DES, Advanced Encryption Standard (AES), and so forth. The cryptosystem may also or instead include any suitable public key infrastructure or the like supporting the distribution and use of keys for encryption, digital signatures, and so forth.

The key ring 518 may facilitate simplified management of the system 500. For example, by reducing the data protection system down to a single key ring 518, the system can eliminate or reduce the overhead for management of keys 516. In one aspect, all of the data on a key ring 518 is protected by one root key 526. By reducing the data protection system down to a single key ring 518 protected by one root key 526, all privileged users 512 on uncompromised platforms can have access to all protected data. In this embodiment, data is either 'IN' (i.e., encrypted), or it's 'OUT' (i.e., not encrypted). In one aspect, the default system does not include any additional shade of access control.

The cryptography library 524 may be disposed on the administration host 504 as shown in FIG. 5. The cryptography library 524 may also be disposed on the endpoint 502, e.g., in a web browser, or it may be disposed on another component of the system 500, or any combination of these. The cryptographic library 524 may be installed by an administrator. In general, key material 530 from the key ring 518 may be stored in a cache 532 on the endpoint 502 within any suitable memory on the endpoint 502 for use in encryption and decryption as contemplated herein. As noted above, an enterprise that systematically uses coloring and indications of compromise can be improved through the use of a key management system as contemplated herein. This system may be still further improved with the addition of a heartbeat system that communicates heartbeats from an endpoint containing health and status information about the endpoint. A suitable heartbeat system is now described in greater detail.

Figure 6:
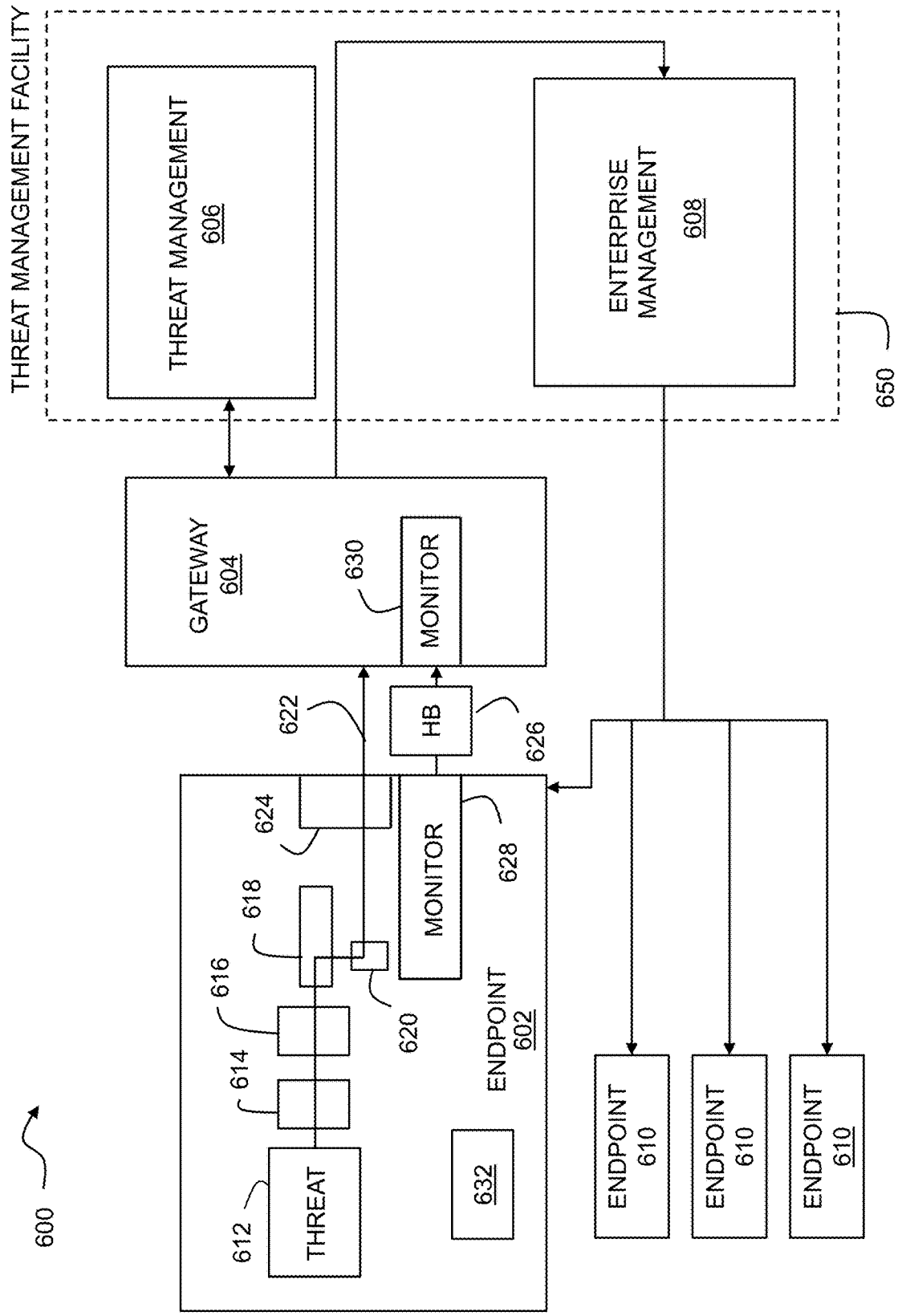
FIG. 6 illustrates a threat management system using heartbeats.

FIG. 6 illustrates a threat management system using heartbeats. In general, a system 600 may include an endpoint 602, a gateway 604, a threat management system 606, and an enterprise management system 608 that manages an enterprise including the endpoint 602, the gateway 604, and one or more additional endpoints 610. Each of these components may be configured with suitable programming to participate in the detection and remediation of an advanced persistent threat (APT) or other malware threat as contemplated herein.

The endpoint 602 may be any of the endpoints described herein, or any other device or network asset that might join or participate in an enterprise network. The endpoint 602 may contain a threat 612 such as an advanced persistent threat, virus, or similar malware that resides on the endpoint 602. The threat 612 may have reached the endpoint 602 in a variety of ways, and may have been placed manually or automatically on the endpoint 602 by a malicious source. It will be understood that the threat 612 may take any number of forms and have any number of components. For example, the threat 612 may include an executable file that can execute independently, or the threat 612 may be a macro, plug-in, or the like that executes within another application. Similarly, the threat 612 may manifest as one or more processes or threads executing on the endpoint 602. The threat 612 may install from a file on the endpoint 602 or a file remote from the endpoint 602, and the threat 612 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or enterprise unless a more specific threat or threat type is explicitly provided or otherwise clear from the context.

The threat 612 may be analyzed by one or more threat countermeasures on the endpoint 602 such as a whitelisting filter 614 that approves each item of code before executing on the endpoint 602 and prevents execution of non-whitelisted code. The endpoint 602 may also include an antivirus engine 616 or other malware detection software that uses any of a variety of techniques to identify malicious code by reputation or other characteristics. A runtime detection engine 618 may also monitor executing code to identify possible threats. More generally, any of a variety of threat detection techniques may be applied to the threat 612 before and during execution. In general, a threat 612 may evade these and other security measures and begin executing as a process 620 on the endpoint 602.

Network traffic 622 from the process 620 may be monitored and logged by a traffic monitor 624 on the endpoint 602. The traffic monitor 624 may, for example, logs a time and a source of each network request from the endpoint 602. Where the endpoint 602 is within an enterprise network, the network traffic 622 may pass through the gateway 604 in transit to a data network such as the Internet. While the gateway 604 may be logically or physically positioned between the endpoint 602 and an external data network, it will be understood that other configurations are possible. For example, where the endpoint 602 is associated with an enterprise network but operating remotely, the endpoint 602 may form a VPN or other secure tunnel or the like to the gateway 604 for use of a threat management system 606, enterprise management system 608, and any other enterprise resources.

The endpoint 602 may use a heartbeat 626 to periodically and securely communicate status to the gateway 604. The heartbeat 626 may be created by a health monitor 628 within the endpoint 602, and may be transmitted to a remote health monitor 630 at the gateway 604. The health monitor 628 may monitor system health in a variety of ways, such as by checking the status of individual software items executing on the endpoint 602, checking that antivirus and other security software is up to date (e.g., with current virus definition files and so forth) and running correctly, checking the integrity of cryptographic key stores, checking for compliance with enterprise security policies, and checking any other hardware or software components of the endpoint 602 as necessary or helpful for health monitoring. The health monitor 628 may thus condition the issuance of a heartbeat 626 on a satisfactory status of the endpoint 602 according to any suitable criteria, enterprise policies, and other evaluation techniques.

The heartbeat 626 may be secured in any suitable manner so that the health monitor 630 can reliably confirm the source of the heartbeat 626 and the status of the endpoint 602. To this end, the heartbeat 626 may be cryptographically signed or secured using a private key so that the monitor 630 can authenticate the origin of the heartbeat 626 using a corresponding public key. In one aspect, the heartbeat 626 may include a combination of plaintext information and encrypted information, such as where the status information for the endpoint is provided in plaintext while a digital signature for authentication is cryptographically secured. In another aspect, all of the information in the heartbeat 626 may be encrypted.

In one aspect, a key vault 632 may be provided on the endpoint to support cryptographic functions associated with a secure heartbeat. An obfuscated key vault 632 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 632, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

A robust heartbeat 626 may usefully provide defensive mechanisms against reverse engineering of obfuscated content (e.g., the private key material stored in key vault 632, the code used to validate the correct running of the remainder of the systems as part of the heartbeat 626 code itself) and any anti-lifting protections to prevent malware from directly using the endpoint 602 (or the health monitor 628 on the endpoint 602) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 626 code itself.

A variety of useful techniques may be employed to improve security of the key vault 632 and the heartbeat 626. For example, the system may use domain shifting so that original key material is inferred based on hardware and software properties readily available to the key vault 632, and to ensure that key material uses non-standard algorithms. Software properties may, for example, include readily determined system values such as hashes of nearby code. In another aspect, the keys may be domain shifted in a manner unique to the endpoint 602 so that the manner of statistical validation of call stacks and core software is unique to the endpoint 602. Further the key vault may be provisioned so that a public key stored in the key vault 632 is signed with a certificate (or into a certificate chain) that can be externally validated by a network appliance or other trusted third party or directly by the health monitor.

The heartbeat 626 may encode any useful status information, and may be transmitted from the endpoint 602 on any desired schedule including any periodic, aperiodic, random, deterministic, or other schedule. Configured in this manner, the heartbeat 626 can provide secure, tamper-resistant instrumentation for status of the endpoint 602, and in particular an indication that the endpoint 602 is online and uncompromised. A disappearance of the heartbeat 626 from the endpoint 602 may indicate that the endpoint 602 has been compromised; however, this may also simply indicate that the endpoint 602 has been powered off or intentionally disconnected from the network. Thus, other criteria may be used in addition to the disappearance or interruption of the heartbeat 626 to more accurately detect malicious software. Some such techniques are described below, but it will be understood that this may include any supplemental information that might tend to make an attack on the endpoint 602 more or less likely. For example, if the heartbeat 626 is interrupted but the endpoint 602 is still sourcing network traffic, then an inference might suitably be made that the endpoint 602 is compromised.

The threat management system 606 may, in general, be any of the threat management systems described herein. The enterprise management system 608 generally provides tools and interfaces for administration of the enterprise and various endpoints 610 and other resources or assets attached thereto. It will be understood that, the functions of the threat management system 606 and the enterprise management system 608 may vary, and general threat management and administration functions may be distributed in a variety of ways between and among these and other components. This is generally indicated in FIG. 6 as a threat management facility 650 that includes the threat management system 606 and the enterprise management system 608. It will be understood that either or both of these systems may be administered by third parties on behalf of the enterprise, or managed completely within the enterprise, or some combination of these, all without departing from the scope of this disclosure. It will similarly be understood that a reference herein to a threat management facility 650 is not intended to imply any particular combination of functions or components, and shall only be understood to include such functions or components as explicitly stated in a particular context, or as necessary to provide countermeasures for advanced persistent threats as contemplated herein.

Figure 7:
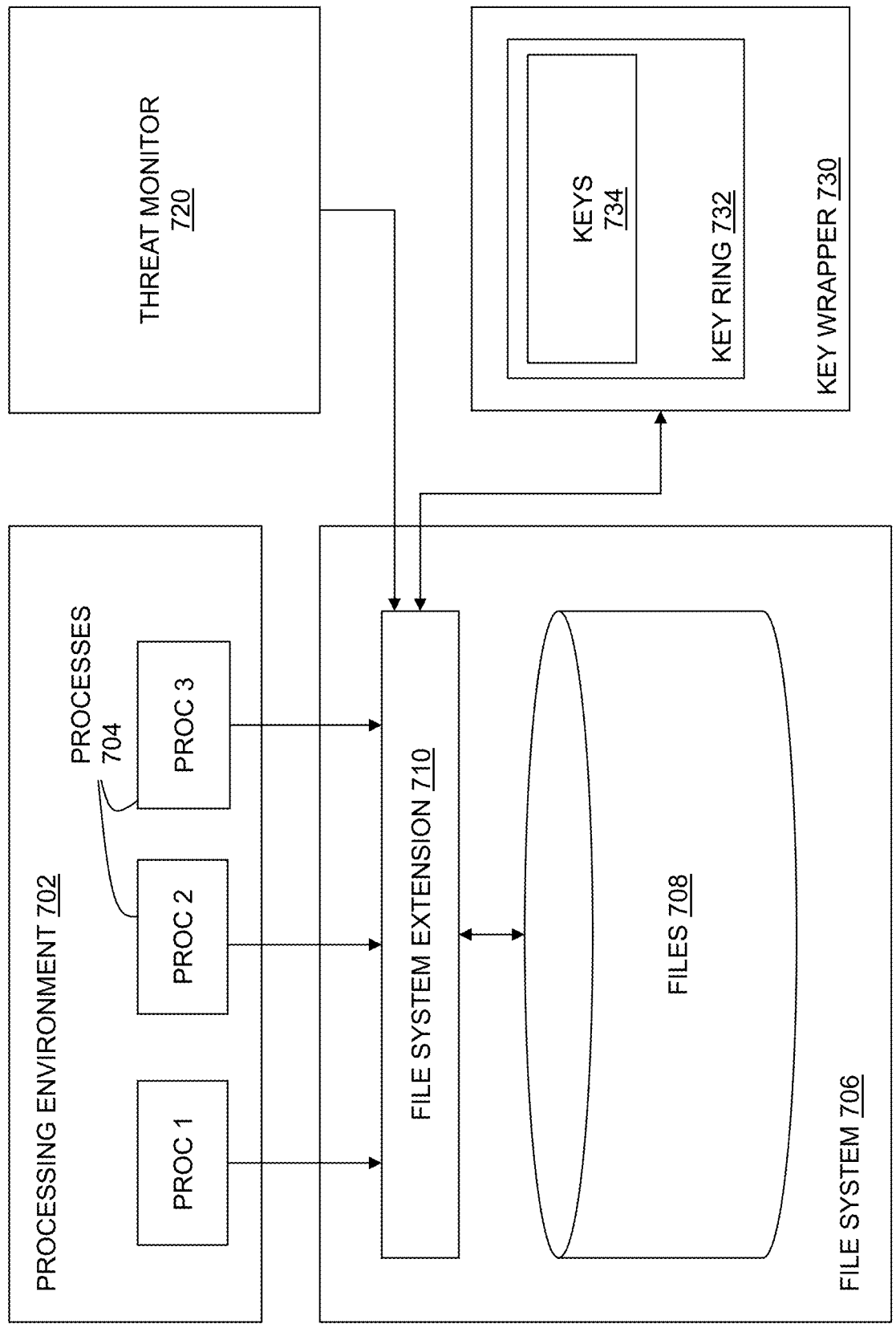
FIG. 7 shows an architecture for endpoint protection in an enterprise network security system.

FIG. 7 shows an architecture for endpoint protection in an enterprise network security system. In general, an endpoint may include a processing environment 702, a file system 706, a threat monitor 720 and a key wrapper 730.

The processing environment 702 may, for example, be any environment such as an operating system or the like suitable for executing one or more processes 704.

Each process 704 may be an instance of a computer program, portion of a computer program or other code executing within the processing environment 702. A process 704 may execute, e.g., on a processor, group of processors, or other processing circuitry or platform for executing computer-executable code. A process 704 may include executable computer code, as well as an allocation of memory, file descriptors or handles for data sources and sinks, security attributes such as an owner and any associated permissions, and a context including the content of physical memory used by the process 704. More generally, a process 704 may include any code executing on an endpoint such as any of the endpoints described herein.

The file system 706 is generally associated with an operating system that provides the processing environment 702, and serves as an intermediary between processes 704 executing in the processing environment 702 and one or more files 708 stored on the endpoint. The file system 706 may provide a directory structure or other construct to facilitate organization of the files 708, and the file system 706 generally supports file functions such as creating, deleting, opening, closing, reading, writing, and so forth.

An extension 710 may be included in the file system 706 by modifying the operating system kernel. While other programming techniques may be employed to perform the functions of an extension 710 as contemplated herein, direct modifications to the operating system permit the extension 710 to operate transparently to the processing environment 702 and the processes 704 without requiring any modifications or adaptations. The extension 710 may, for example, be implemented as a file system filter (in a MICROSOFT WINDOWS environment) or a mount point to a directory (in an APPLE iOS environment). The extension 710 to the files system as contemplated herein performs two concurrent functions. First, the extension 710 communicates with a threat monitor 720 in order to receive updates on the security status and exposure status of the processes 704 or the endpoint. Second the extension 710 communicates with a key wrapper 730 that provides key material for encrypting and decrypting data in the files 708. Finally, the extension 710 operates to conditionally provide encryption and decryption of the files 708 for the processes 704 based on a current security or exposure state, as described in greater detail below.

The threat monitor 720 may include any suitable threat monitoring, malware detection, antivirus program or the like suitable for monitoring and reporting on a security state of an endpoint or individual processes 704 executing thereon. This may include local threat monitoring using, e.g., behavioral analysis or static analysis. The threat monitor 720 may also or instead use reputation to evaluate the security state of processes 704 based on the processes 704 themselves, source files or executable code for the processes 704, or network activity initiated by the processes 704. For example, if a process 704 requests data from a remote URL that is known to have a bad reputation, this information may be used to infer a compromised security state of the endpoint. While a threat monitor 720 may operate locally, the threat monitor 720 may also or instead use remote resources such as a gateway carrying traffic to and from the endpoint, or a remote threat management facility that provides reputation information, malware signatures, policy information and the like for the endpoint and other devices within an enterprise such as the enterprise described above.

In general, the threat monitor 720 provides monitoring of a security state and an exposure state of the endpoint. The security state may, for example, be 'compromised', 'secure', or some other state or combination of states. This may be based on detections of known malware, suspicious activity, policy violations and so forth. The exposure state may be 'exposed' or 'unexposed', reflecting whether or not a particular process 704 or file 708 has been exposed to potentially unsafe content. Thus, exposure does not necessarily represent a specific threat, but the potential for exposure to unsafe content. This may be tracked in a variety of ways, such as by using the coloring system described above with reference to FIG. 5.

The key wrapper 730 may contain a key ring 732 with one or more keys 734 for encrypting and decrypting files 708. The key ring 732 may be cryptographically protected within the key wrapper 730 in order to prevent malicious access thereto, and the key wrapper 730 may communicate with the extension 710 to provide keys 734 for accessing the files 708 at appropriate times, depending, for example, on whether processes 704 are secure or exposed. In one aspect, the files 708 are stored in a non-volatile memory such as a disk drive, or in a random-access memory that provides a cache for the disk drive, and the key wrapper 730 may be stored in a separate physical memory such as a volatile memory accessible to the operating system and the extension 710 but not to processes 704 executing in the user space of the processing environment 702.

In one aspect, every document or file on the endpoint may have a separate key. This may be, for example, a unique, symmetric key that can be used for encryption and decryption of the corresponding file. The key wrapper 730 may control access to the key material for encrypting and decrypting individual files, and may be used by the extension 710 to control access by individual processes 704 executing on the endpoint. As described herein, the extension 710 may generally control access to files 708 based on an exposure state, a security state, or other context such as the user of a calling process or the like. In the event of a severe compromise, or a detection of a compromise independent of particular processes, a key shredding procedure may be invoked to destroy the entire key wrapper 730 immediately and prevent any further access to the files 708. In such circumstances, the keys can only be recovered by the endpoint when a remediation is confirmed. Alternatively, the files may be accessed directly and decrypted from a secure, remote resource that can access the keys 734.

Figure 8:
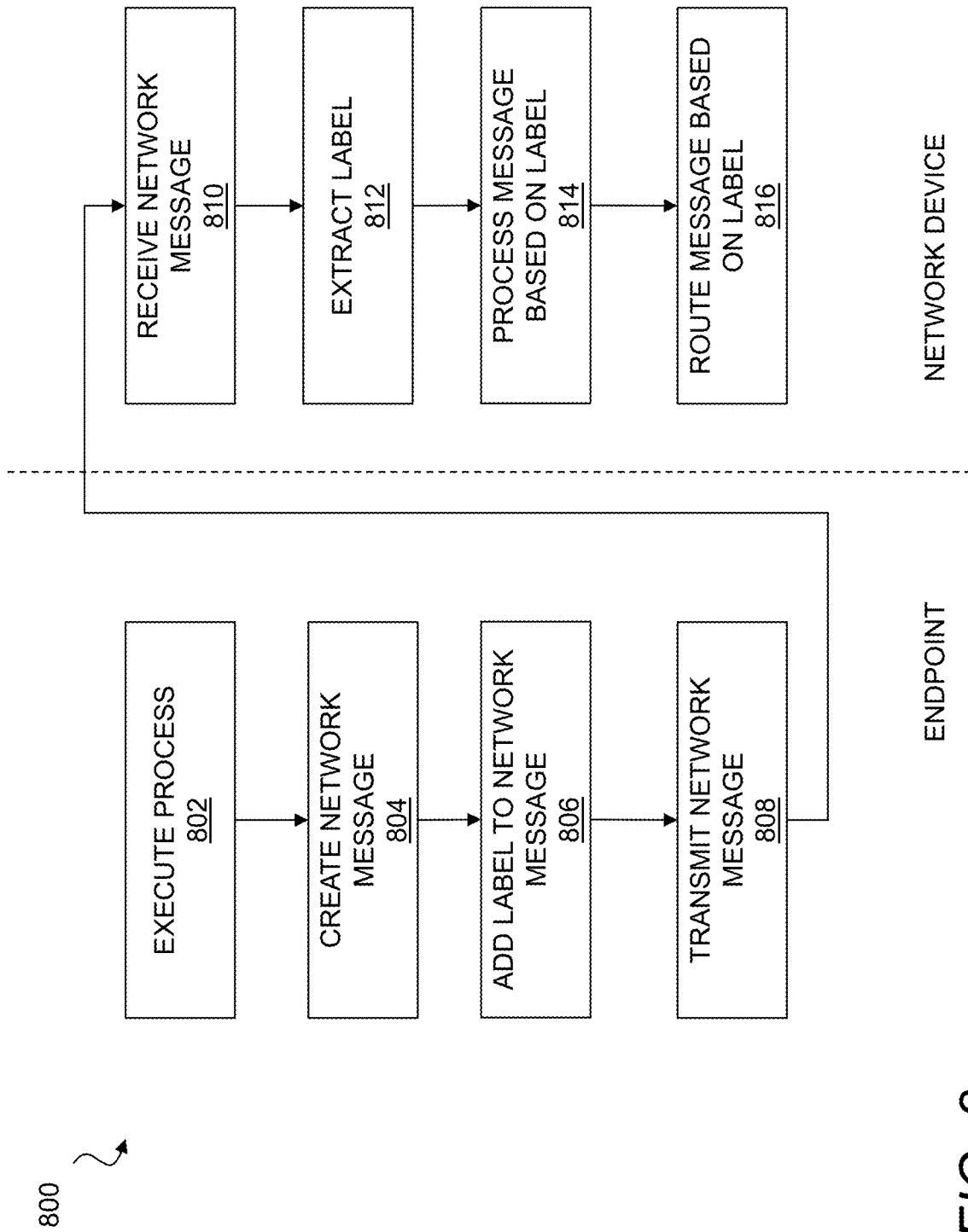
FIG. 8 shows a flowchart of a method for labeling network flows.

FIG. 8 shows a method for labeling network flows. In general, network flows may be explicitly labeled according to source applications (or source processes or the like) to permit tracking and management according to a source after a network flow leaves an endpoint.

As shown in step 802, the process 800 may include executing a process on an endpoint, such as any of the endpoints described herein. The process 800 may, for example, be associated with an application on the endpoint.

As shown in step 804, the process 800 may, at some point during its execution, create a network message. In general, a network message may include a header containing, e.g., a source address, a destination address, and other information necessary or helpful for supporting data network communications between the endpoint and an intended destination. The network message may, for example, be in response to an explicit user input such as directing a browser to a web address, or in response to an implicit user input such as requesting a software update or performing an online backup. This may also or instead be fully automated under any of a variety of normal circumstances. This may also, however, be outbound traffic from malware, and by labeling the network traffic, malicious activity may be more easily detected after the network message has left the endpoint.

As shown in step 806, the process 800 may include adding a label to the network message. This may, for example, include generating a label that includes context information related to the network message, such as an identifier for an application or process. This identifier may be cryptographically signed or encrypted to protect the contents thereof, and may include additional information about, e.g., the status of the endpoint, the reputation of the application or the destination address, or any other information necessary or helpful for making improved routing or processing decisions about network traffic. Thus, the process 800 may include cryptographically signing the label, encrypting the contents of the label, or any other suitable cryptographic steps. Packet structures for network communication are generally known, and may for example include a header with control and routing information, along with a payload of data for communication to a recipient. The header may include various items of information useful for network communications such as a preamble that identifies a beginning of the packet, a source address, a destination address, a sequence number (e.g., for spreading a large file or the like across multiple packets/payload), a packet length, a packet type, a cyclic redundancy check or other checksum or the like, and any other useful information. A label as contemplated herein may be usefully incorporated into the header of such a packet in any suitable format and any suitable location. For example, internet protocol version '4' and version '6' both permit optional information to be included in a packet, and the label may be included as optional information. For example, the label may be included by encapsulating a packet within another packet that includes label information. For example, a label may be included by repurposing a portion of a packet header. For example, a label may be included by injecting additional label data into the packet, or for example, at the start of the data portion of the packet.

As shown in step 808, the process 800 may include transmitting the network message from the endpoint, e.g., through a network interface or the like to a data network.

According to the foregoing, in one aspect there is disclosed herein an endpoint configured as described above to label outbound network messages to identify a source process or application. Thus, there is disclosed herein a system comprising an endpoint including a network interface configured to couple the endpoint in a communicating relationship with a data network. The endpoint may include a memory and a processor such as any of the memories, processors, or processing circuitry described herein. In general, the processor may be configured to execute instructions stored in the memory to perform the steps of generating a label for a network message created by a process executing on the endpoint and associated with an application, where the network message includes a payload and a header and where the label includes an identifier for the application, adding the label to the header of the network message, and transmitting the network message through the network interface to a remote location on the data network. At the same time, a network device or the like may be configured to receive the network message and process it in a variety of ways, as further discussed herein.

As shown in step 810, the process 800 may include receiving a network message from an endpoint at a network device. The network message may be the network message described above, or any other packet or other data structure including a payload of data and header information such as a source address for the endpoint and a destination address for an intended recipient of the network message. The network message may also include a label that identifies an application that generated the network message on the endpoint. This may for example, be determined by examining the properties of a process associated with the application, or otherwise relating a process or other source of the network message with a particular application.

It should be understood that this receiving step may be performed at a wide range of network devices. In one aspect, this may include a router, a gateway, a firewall, a threat management facility for an enterprise, or any other network device for handling network communications to and/or from the endpoint. This may include a network device on a local network used by the endpoint, a cloud-based network device used in an enterprise network security system, a physical gateway between an enterprise network and an external network, or some combination of these. In one aspect, the firewall may be a local firewall for the endpoint that is configured to locally enforce routing rules based on information obtained in the label.

While a source application may be a useful item of information to be included in the label, it will be understood that other context information may also or instead be included. For example, this may include the identity of a process of an application that created the network message, a user of the process that created the network message, or other identity or source information, such as a name or other identity of the endpoint. For the endpoint name this may include a fully qualified name such as a device identifier that is unique within the domain of the endpoint. This may also or instead include a reputation of the application or process that created the network message if this is locally available to or determined by the endpoint. In this context, the reputation may specify a particular reputation (e.g., known good, known bad, suspected bad, or the like) or the reputation may specify an absence of specific information (e.g., unknown). This may also or instead include health information about the endpoint or a process, coloring information for the process that identifies exposure of the process to other processes or data on the endpoint, reputation or exposure information for data used by the process, and so forth. The label may include status information related to the endpoint, such as an activity level of the endpoint, a status of software installed on the endpoint, a security condition of the endpoint (e.g., anti-malware software installed, a warning state of control software, and so forth), or other useful status indications in evaluating context of the network traffic and the like.

It should also be understood that, while the process 800 described herein may involve proactive labeling of network flows, or labeling of all network flows from an endpoint, the process 800 may also or instead be adapted to be responsive to detection and query by a network device, such as a threat management facility, a firewall, a gateway, a server, or the like. For example, a malware attack that exfiltrates data may begin with a file upload using a file transfer protocol (FTP) request or an HTTP PUT. When upload activity from the endpoint is detected at a network device, this may cause the network device to actively query the endpoint to request information about the application that requested the upload, such as an identifier of the application, a reputation of the application, or the like. For example, the network device may direct the endpoint to label all traffic from a user, from an application, from a process, or from a device. For example, the network device may direct the endpoint to label all traffic from processes that are currently active. For example, the network device may direct the endpoint to label all traffic from users that are currently active. For example, the network device may direct the endpoint to label all traffic from a user associated with a process. For example, the network device may first direct the endpoint to label all network traffic to identify a process. The network device may then identify a process of interest, and direct the endpoint to label all traffic associated with the process of interest, or associated with a user associated with the process of interest. These and other similar adaptations are intended to fall within the scope of this disclosure.

The process may also or instead be adapted to be responsive to detecting suspicious activity at the endpoint. Upon detecting suspicious activity, the endpoint may begin to label network traffic associated with the suspicious activity. The label may indicate that the labeled network traffic is associated with suspicious activity. The label may provide additional context for the network traffic and associated application or process. A network device receiving labeled network traffic from an endpoint may then take additional measures, such as observing and recording the content of the network traffic, inspecting the content of the network traffic, verifying the reputation of the destination(s) of the network traffic, verifying the reputations of the application(s) generating the network traffic, determining whether there is other network traffic from other devices on the network directed to the destination, notifying an administrator, and so on.

The process may also or instead be adapted to be responsive to detecting suspicious activity at an endpoint that hosts one or more virtual machines. Upon detecting suspicious activity, the endpoint may label network traffic with context associated with the virtual machine. For example, the label may include an identifier for the virtual machine, e.g., if the virtual machine is not using a unique network address. The label may indicate that the labeled network traffic is associated with suspicious activity. The label may provide additional context for the network traffic and associated application or process. A network device, or a virtual machine host, or another virtual machine on the same host that is receiving labeled network traffic from the virtual machine, may then take additional measures.

The process may also or instead be adapted to be responsive to detecting suspicious activity at a network device.

Upon detecting suspicious activity, the first network device may begin to label network traffic associated with the suspicious activity. The label may indicate that the labeled network traffic is associated with suspicious activity. The label may provide additional context for the labeled network traffic that may be available at the network device, for example, that the traffic transited the network device, or came from a particular subnet, or was recorded by the network device. The label may provide a reference to additional information collected by the network device about the suspicious network traffic. For example, the reference may be to a recording of the content of the network traffic. A network device receiving labeled network traffic from an endpoint may then take additional measures, such as observing and recording the content of the network traffic, inspecting the content of the network traffic, verifying the reputation of the destination(s) of the network traffic, verifying the endpoint(s) generating the network traffic, determining whether there is other network traffic from other devices on the network directed to the destination, notifying an administrator, and so forth.

As shown in step 812, the process 800 may include processing the network message on a network device that receives the network message to extract the label. This may, for example, include cryptographically verifying an authenticity of the label or a source of the label, decrypting the label to extract encoded information, or any other form of processing.

As shown in step 814, the process 800 may include processing the network message at a network device based on the label. While routing is generally contemplated as described below, a number of additional processing steps may usefully be performed. For example, the process 800 may include caching the label, for example associated with the application and a reputation of the application on the network device.

As shown in step 816, the process 800 may include routing the network message based on the application (or process or other source on the endpoint) that generated the network message. The routing may be a conditional routing based on the information in the label, or information determined from the information in the label. This may include routing rules or combinations of rules that may be based, for example, on user identity, process/application, reputation, and so forth. For example, the processor may be further configured to perform the steps of determining a reputation of the application and routing the network message to the destination address conditionally based on the reputation of the application that generated the network message. That is, if the reputation of the application is known and good, then the traffic may be routed as requested by the endpoint according to the routing information in the network traffic. However, if the reputation of the application is known and bad, then the traffic may be sequestered in any suitable manner. For example, the traffic may be dropped. Additional steps may be taken. For example, when the reputation of the application is uncertain, or other information is collectively inconclusive, a sandbox based on the endpoint may be created and used to communicate with the destination address to test for malicious activity. In another aspect, where information is inconclusive, the network traffic may be permitted, but more aggressive monitoring may be initiated until a conclusive evaluation of the source application can be obtained. For example, the network device may observe and record the network traffic, inspect the content of the network traffic, verify the reputation of the destination(s) of the network traffic, verify the reputations of the application(s) generating the network traffic, determine whether there is other network traffic from other devices on the network directed to the destination, notify an administrator, and so forth. In another aspect, an indication of malware or other compromise on the endpoint may be used as a basis for initiating remediation of the endpoint.

Likewise, in the case of uncertain application reputation, some users may have additional permissions with respect to network traffic routing decisions. For example, a user designated as an accounting user, who may have access to more sensitive information may have traffic blocked, while a user in sales or customer support may be permitted with additional monitoring or safeguards.

In this context, it will be appreciated that an application or process identifier in the label may be used as a single item of information in a broader context for the network message. For example, the label may include a health status of the endpoint, other status information of the endpoint, a user identifier for a user of the application or a related process (e.g., automated machine activity—e.g., daemon, backup service—might be treated differently from human activity, categories of users may be treated differently than others, and the like), a name of the endpoint, reputation information for the source application, and so forth. Thus, the application identifier may be useful by itself, but the accuracy of attack detection may be improved still further by using additional context for the network message, which may include various pieces of contextual information inserted directly into the label for the network message, as well as other information available to a network device called upon to make a routing decision for a particular network message (e.g., allowing, blocking, rerouting, and so forth). The routing decision may include blocking the message. All such variations that would be apparent to one of ordinary skill in the art are intended to fall within the scope of this disclosure.

According to the foregoing, there is disclosed herein a system that includes a network device that may use labels provided by endpoints that identify source applications or processes and the like for network messages. In one aspect, a system disclosed herein includes a network device including a network interface configured to couple the network device in a communicating relationship with a data network that includes an endpoint, a memory on the network device, and a processor on the network device. The processor may be configured to execute instructions stored in the memory to perform the steps of receiving a network message from an endpoint through the network interface, where the network message includes a source address for the endpoint, a destination address for an intended recipient of the network message, a label that identifies an application that generated the network message on the endpoint, and a payload of data. The processor may be further configured to execute instructions stored in the memory to perform the steps of processing the network message to extract the label, and routing the network message based on the application that generated the network message.

In one use of this system, the processor may be configured to determine a reputation of the application and to route the network message to the destination address conditionally based on the reputation of the application that generated the network message, for example as described above. Where information such as user information is available, the processor may be further configured to extract a user identifier from the label that identifies a user of the application on the endpoint, which may also be usefully employed for various intelligent routing processes as contemplated herein.

Figure 9:
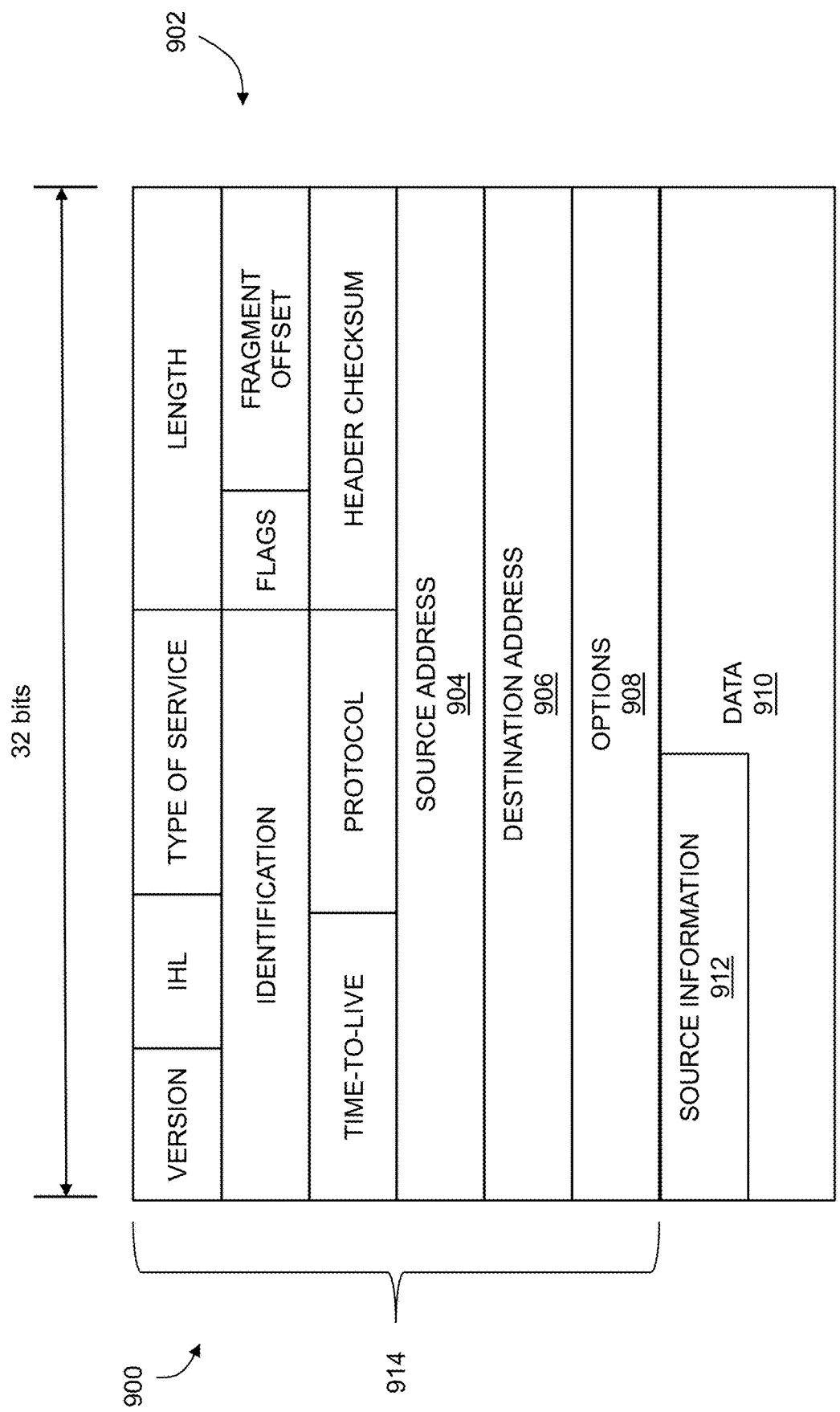
FIG. 9 illustrates an Internet Protocol packet.

FIG. 9 illustrates an Internet Protocol (IP) packet format. In general, the packet 900 may include preamble information 902, a source address 904, a destination address 906, option information 908, and a payload of data 910. As described herein, the source address 904 may generally specify a network location that originated the packet 900, but may not provide any more specific information about a source user, a source machine, a source application, and other information as contemplated herein.

In one aspect, this information may be usefully added to the packet 900 by inserting relevant information into the option information 908, or in any other suitable location within the packet 900 or packet header. For example, the Internet Protocol version '4' (IPv4) packet may be configured such that additional information may be included in the packet header, which may be specified by the internet header length (IHL) data and an option type field. This field is identified in FIG. 9 as option information 908. In ordinary use, the option type field is sub-divided into a one-bit copied flag, a two-bit class field, and a five-bit option number. These taken together form an eight-bit value for the option type field. In one aspect, this field may be used to specify additional source information, or to identify a link or pointer to a location where such information can be obtained. For example, up to 60 bytes of optional, additional data may be included in the header, and a label may be included in this additional data. For example, where the packet is used within an enterprise domain, a portion of the header may be used by any source-aware networking components to identify a source, or to provide a pointer to source information which may, for example, be within the data 910 of the packet 900, within a separate packet, or stored at a network-accessible location such as a gateway, firewall, or threat management facility. An internet protocol version '6' (IPv6) packet may include a 20-bit flow label field, as well as the availability to provide extension headers to indicate optional information. For example, the flow label field may be used to include a 20-bit label. For example, a 'Destination Options' extension header may be used to include label information that is not required to be examined by intermediate networking devices, but may be examined by a gateway or a final destination.

In one aspect, the option information 908 of an IPv4 packet may be used to designate the packet as containing source information 912 within the data 910 of the packet 900. Thus, for example, the first byte or bytes of the data 910 may be used to specify source information at any desired level of granularity including a user, a machine, an application, a process, and so forth, as well as combinations of these. The source information 912 within the data 910 may also or instead provide a link to a resource within the enterprise network where source information for the packet 900 can be retrieved. It will be understood that source information, whether stored within source information 912 in the packet 900, within the option information 908 in the packet header 914, or stored in some remote resource, may in general be encrypted to secure source information against unauthorized access, and/or the source information may be digitally signed to permit verification of authenticity with reference to a trusted third party or internal trust authority.

In one aspect, source information 912 may include a reference to a process or other context information for an endpoint. The endpoint may communicate context information to a network device through a separate channel, for example using the heartbeat 314 channel (see, e.g., FIG. 3). The context information may be stored on the endpoint, and the source information 912 in the packet 902 may include a reference to the context information. Thus, context information may be provided via a first channel, and a reference to the context information may be provided in a packet label. For example, each process on an endpoint may be assigned an identifier, and the identifier communicated to the network device with the operating system process information when the process is detected. The identifier may be included in the label. In this way, machine-specific information may not be included in the packet, but only a reference to the information. In some implementations, the identifier is changed periodically.

A flag within the packet header 914 may also or instead be used to identify when (and where) source labeling information is present for a packet 900.

In one aspect, the packet 900 may be configured to be compatible with other IP network traffic, so that packets can move into and out of the enterprise network without additional handling, such as by inserting source information 912 into the data 910 of the packet payload as illustrated in FIG. 9. In another aspect, packets may be processed at the perimeter of the enterprise network, e.g., at a VPN gateway, enterprise network gateway, or any other perimeter network device, or other suitable router, switch, or other network device inside the enterprise network, with non-IP compliant packet data and/or structures being removed for outbound traffic, and where possible or applicable, reinserted for inbound traffic. In another aspect, traffic from outside the enterprise network may use a predetermined flag or the like to indicate that a packet contains source information compliant with a format for source information used within the enterprise network. More generally, any suitable techniques may be used to permit communication of source context information with network traffic within a network, while ensuring compatibility with an external network architecture such as TCP/IP or the like, and all such techniques that would be apparent to one of ordinary skill in the art are intended to fall within the scope of this disclosure.

Figure 10:
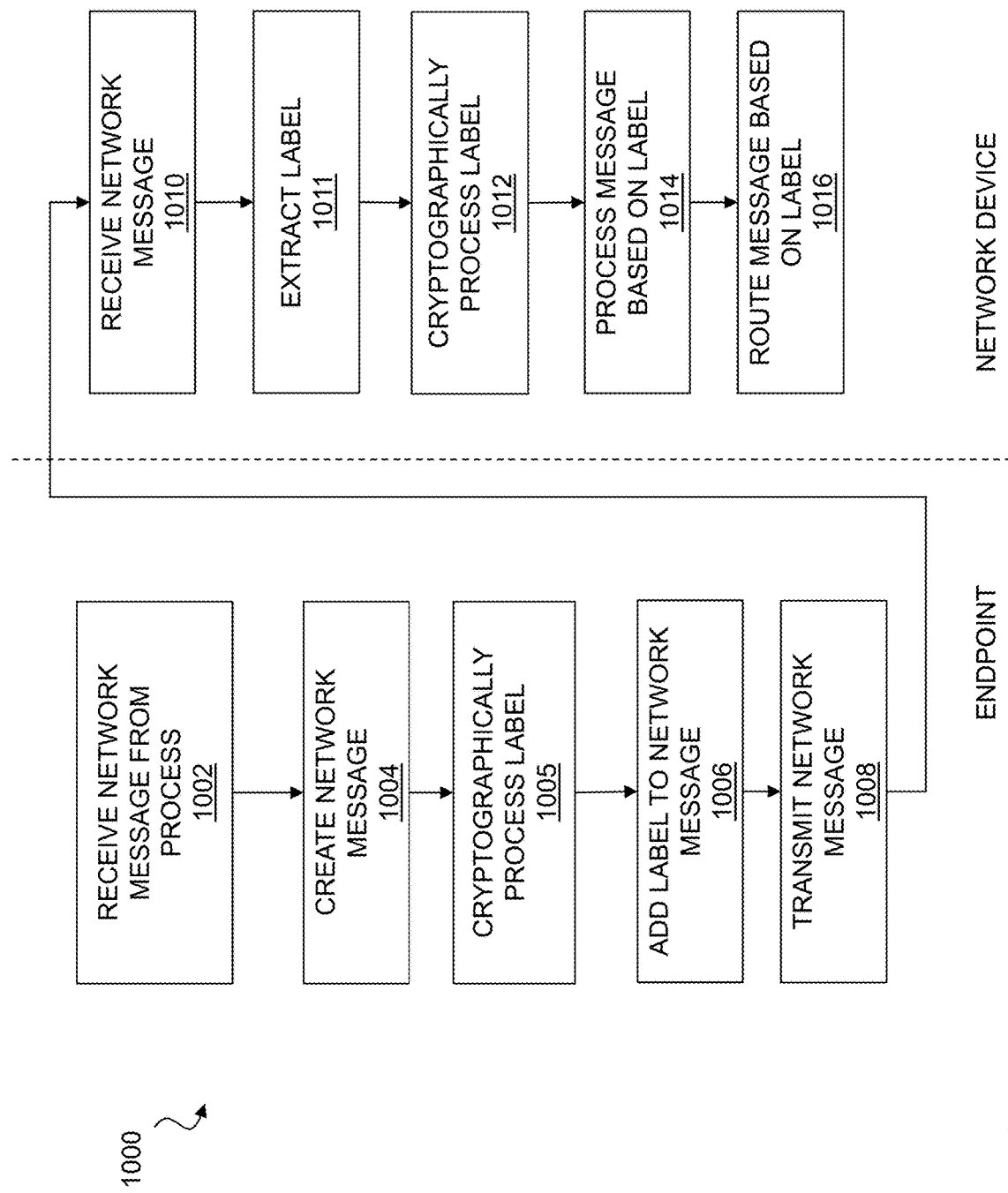
FIG. 10 shows a flowchart of a method for secure labeling of network flows.

FIG. 10 shows a method for secure labeling of network flows. A system for labeling network flows is generally described herein (e.g., above). A network enterprise security system may be improved by instrumenting endpoints to explicitly label network flows with cryptographically secure labels that identify an application or other source of each network flow. Cryptographic techniques may be used, for example, to protect the encoded information in the label from interception by third parties or to support cryptographic authentication of a source of each label. As discussed above, a label may provide health, status, or other heartbeat information for the endpoint, and may be used to identify compromised endpoints, to make routing decisions for network traffic (e.g., allowing, blocking, or re-rerouting), to more generally evaluate the health of an endpoint that is sourcing network traffic, or for any other useful purpose.

As shown in step 1002, the method 1000 may include receiving a network message from a process executing on the endpoint. In general, the process may be based on an application on the endpoint. As described herein, the network message may be a packet or the like that includes a payload and a header, and that is addressed to a remote location (e.g., using an Internet Protocol address, Uniform Resource Locator (URL), or other address) accessible from the endpoint through a data network.

As shown in step 1004, the method 1000 may include generating a label for the network message. As described herein, the label may include information about a source of the network message on the endpoint, e.g., an application, a process, a user or the like on the endpoint that originated the network message, or an identity of the endpoint itself, such as by reference to a globally unique name of the endpoint within an enterprise domain. Thus, for example, the label may include an identifier for the application that generated the network message, an identifier for the endpoint that generated the network message, the identifier of a user of the process on the endpoint that generated the network message, or any other useful source identifier. The label may also or instead encode useful information about the status of the endpoint. For example, the label may include a health status of the endpoint or any other useful information.

As shown in step 1005, the method 1000 may include cryptographically processing the label information. This may, for example, include cryptographically signing the label to provide a signed label information. This signed label may be used, for example, to verify an identity of the endpoint, an identity of an application on the endpoint, an identity of a process executing on the endpoint, or any combination of these that is useful for identifying a source of the network message. This signed label may be verified, for example, using a public key for the source that is signing the label, or through any other suitable relationship with a trusted third party capable of cryptographically authenticating the source. Cryptographically processing the network message may also or instead include encrypting the label with a cryptographic key to provide an encrypted label that is secured against interception by third parties.

As shown in step 1006, the method 1000 may include adding the cryptographically process label (e.g., the signed label and/or encrypted label) to the header of the network message.

As shown in step 1008, the method 1000 may include transmitting the network message from the endpoint to the remote location through the data network.

As shown in step 1010, the method may include receiving the network message from the endpoint at a network device such as a gateway, a firewall, a router, a switch, or a threat management facility, any of which may be a hardware device physically positioned between the endpoint and an external data network, or a cloud-based device accessible to the enterprise network for the endpoint through a remote service or resource. The network message may be any of the network messages described herein, and may include an encrypted label that identifies an application that generated the network message, and/or a signed label that can be used to verify a source or the security of the label.

As shown in step 1011, the method 1000 may include processing the network message on the network device to extract the label.

As shown in step 1012, the method may include cryptographically processing the label. This may, for example, include verifying a source of the label or decrypting the label with a cryptographic key to provide a decrypted label.

As shown in step 1014, the method 1000 may include processing the network message based on the label, for example, by caching label or payload contents on the network device, requesting a scan or remediation of the endpoint that provided the message, or any other responsive processing. This may, for example, include receiving an indication that the endpoint is compromised, e.g., either embedded within the label or through another communication channel. For example, the network device may receive a heartbeat from the endpoint, and the indication of compromise may be inferred from an absence of the heartbeat when expected, or the indication of compromise may be explicitly added by the endpoint (e.g., by a security agent executing on the agent) into the heartbeat. This indication of compromise may be used as a basis for preventing routing of additional network traffic from the compromised application through the network device. This routing or forwarding restriction may be maintained, for example, until the expected heartbeat resumes from the endpoint/application, or until an explicit remediation measure is completed.

By labeling network flows by application in this manner, the network device that is handling the network flow can advantageously make routing or blocking decisions on an application-by-application basis rather than for an entire endpoint, thus limiting network restrictions to particular applications that are compromised while permitting other applications on an endpoint to continue normal network communications, or optionally network communications with some heightened level of scrutiny or security.

As shown in step 1016, the method 1000 may include routing the network message based on the decrypted label, for example using any of the techniques described herein.

Figure 11:
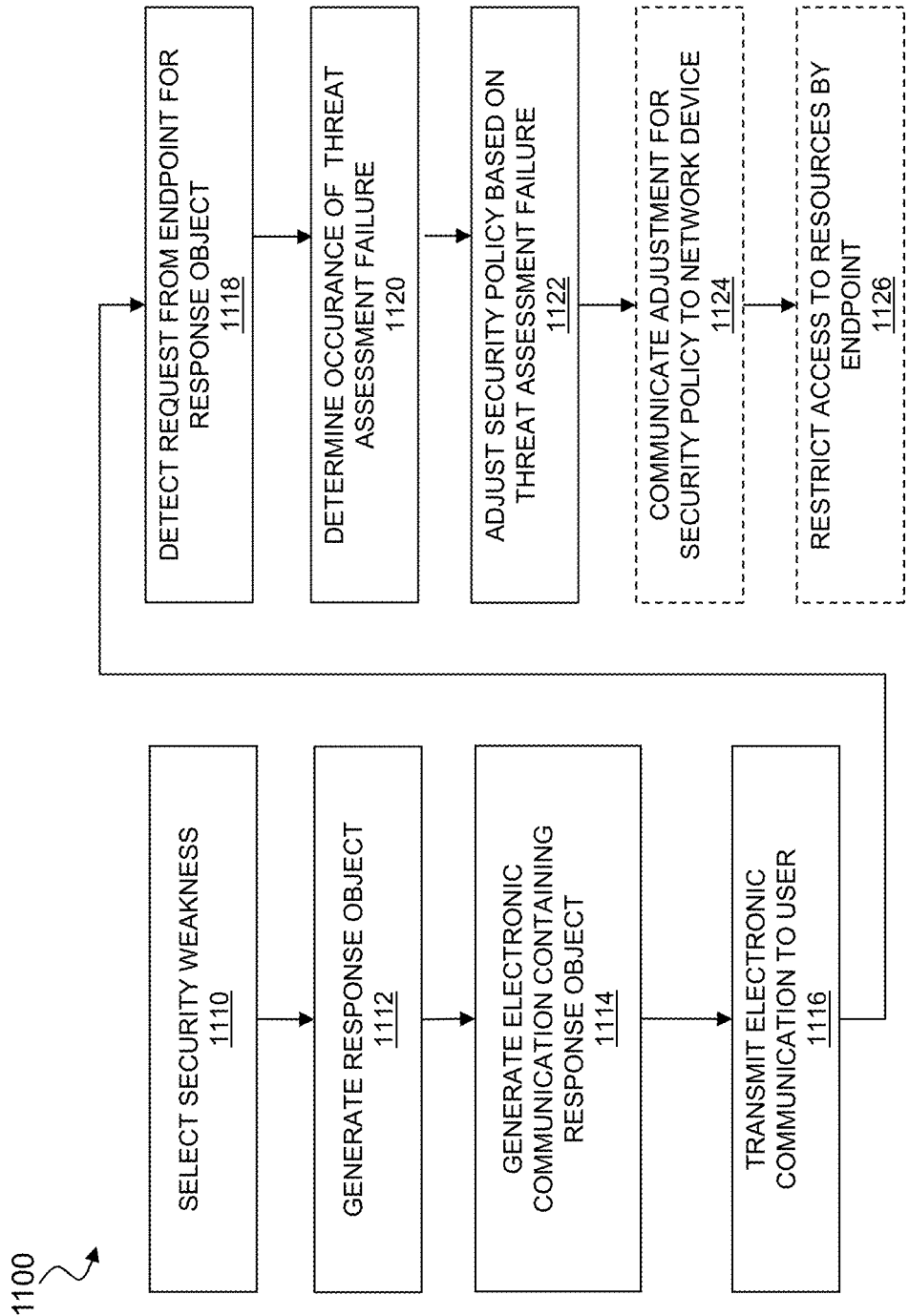
FIG. 11 is a flow diagram of an exemplary embodiment of a method for identifying and remediating phishing security weaknesses associated with a particular user identifier.

FIG. 11 shows an exemplary method 1100 for identifying and remediating phishing security weaknesses associated with a particular user identifier. In general, the exemplary method 1100 may be implemented by any one or more of the threat management facilities disclosed herein and in a communicating relationship (e.g., via a heartbeat system, such as the heartbeat system 314 in FIG. 3) with one or more endpoints coupled to an enterprise network. For example, any one or more of the threat management facilities disclosed herein may include a processor and a memory, the memory bearing computer executable code configured to be executed by the processor to perform one or more steps of the exemplary method 1100. As described in greater detail below, the exemplary method 1100 may result in the execution of prophylactic measures that may reduce the likelihood of a successful phishing attack on the one or more endpoints coupled to the enterprise network.

As shown in step 1110, the method 1100 may include selecting a security weakness for a user identifier associated with a user in an enterprise network. For example, the security weakness can include a phishing vulnerability. Additionally, or alternatively, the security weakness can include missing security updates. More generally, any hardware, software or behavioral security weakness that can be programmatically tested or monitored may be used as the security weakness discussed herein. This may, for example, include a software update pattern of a user, a response of a user to an administrative request such as a request to update an application, communication or storage of confidential information, usage patterns of network connections (e.g., cellular or public WiFi hotspots or the like), file download patterns, usage patterns for removable storage devices such as USB drives, poor or weak password selections, or any other resource usage patterns or the like that present potential vulnerabilities for an endpoint.

As shown in step 1112, the method 1100 may include generating a response object corresponding to the security weakness. For example, access to the response object may identify an action by the user exposing the security weakness, such as a tendency to select phishing hyperlinks, opening attachments from low-reputation sources, etc. It will be understood that the term 'object' as used herein may include any data, process, file or combination of these including without limitation any process, application, executable, script, dynamic linked library, file, data, database, data source, data structure, function, resource locator (e.g., uniform resource locator (URL) or other uniform resource identifier (URI)), or the like that might be manipulated by one of the computing devices described herein.

As shown in step 1114, the method 1100 may include generating an electronic communication containing the response object. In general, the electronic communication may include information useful for identifying a user's interaction with the electronic communication and, thus, identifying a user's response to the security weakness forming the basis of the response object. For example, the response object associated with the electronic communication may include at least an attached document, a user identifier, and executable code embedded within the attached document. The executable code may be configured to transmit, for example, the response object and, optionally, transmit the user identifier from the endpoint when the attached document is opened. In certain implementations, a file system on the endpoint may be additionally or alternatively monitored to detect file system activity related to the attached document, and the user identifier may be transmitted from the endpoint based upon detection of certain file system activity related to the attached document (e.g., opening the attached document). The attached document may be any of various different known document types that are commonly transmitted via electronic communications and, thus, more specifically may include any one or more of a word processing file, a spreadsheet file, an accounting file, an archive file, an image file, a presentation file, and a database file. Further, or instead, the electronic communication may include human readable text including instructions to the user to open the attached document or otherwise interact with the attached document in a manner emulating the launch of a threat at the endpoint.

In some implementations, the URL is for a resource on a publicly available location, such as a web site. In some implementations, the URL is for a resource on a private location, such as a private web site. In some implementations, the URL may be designed to be perceived by a user to be associated with a particular sender. In some implementations, the URL is for a resource on the user's device, such as a local file system, or on the user's network such as a shared drive or file system.

In certain implementations, generating the electronic communication can include customizing the electronic communication for the user. Examples of customizing the electronic communication for the user include, but are not limited to, the inclusion of a name, the user identifier, a title, or an organizational role of the user. Customizing may also or instead include tailoring content in a manner specific to a user's job responsibilities. For example, this may include disguising a communication as related to a financial transaction for transmittal to an accounting department, or otherwise adapting the communication so that it appears relevant to a user's role or responsibilities within an organization.

In certain implementations, and with the appropriate consents, customizing may also or instead include tailoring content to a user's interests or affiliations. For example, if the user is a bicycle enthusiast, the customizing may include a communication related to bicycles. In certain implementations, and with the appropriate consents, the customizing may also or instead include tailoring content to entities that have previously sent communications to the user. For example, if the user receives correspondence from a certain organization, such as a particular university, bicycle shop, or bank, just as a few examples, the customizing may include an appearance that the communication comes from that university, bicycle shop, or bank.

As shown in step 1116, the method 1100 may include transmitting the electronic communication to the user.

As shown in step 1118, the method 1100 may include detecting a request from an endpoint for the response object. In response to detecting the request from the endpoint for the response object, one or more of various different actions may be implemented to reduce the likelihood that the security weakness may compromise the network in the event of an actual phishing threat. For example, in response to detecting the request for the response object, the user may be automatically enrolled in a program including training content associated with the security weakness. Further, or instead, in response to detecting the request for the response object, the user may be provided with educational material (e.g., educational material including training content associated with the security weakness).

In certain implementations, the method 1100 may further include tracking one or more parameters probative of the delivery, effectiveness, or both of the training content assigned to the user. Tracking such parameters may be useful, for example, for increasing user compliance, such as in implementations in which the user is made aware that the user's interaction with the training content is being monitored. Thus, for example, the progress of the user through the training content may be tracked and, optionally, reminders may be provided to the user regarding completion of the training content. Further, or instead, the user may be retested on adherence to the training content after a predetermined interval.

As shown in step 1120, the method 1100 may include determining occurrence of a threat assessment failure related to the security weakness. In general, such determination of the threat assessment failure may be based upon detecting activity related to interaction with the response object on the endpoint.

As shown in step 1122, the method 1100 may include adjusting a security policy for the endpoint based on the threat assessment failure. In general, the security policy may control interaction between the endpoint and any one or more types of objects, including any one or more types of objects corresponding to the response object. For example, the security policy may control access by the endpoint to any one or more types of objects. Further, or instead, the security policy may control the ability of the endpoint to send any one or more types of objects to other endpoints on the network.

While the adjustment to the security policy for the endpoint may be binary with respect to the threat assessment failure, the threat assessment failure may further or instead form a basis for non-binary adjustments to the security policy. For example, the threat assessment failure may be included in a threat index for the user. The threat index may form a basis for incrementally adjusting one or more aspect of the security policy for the endpoint over a range. As an example, the threat index can form a basis for a level of scrutiny applied to URLs requested by the endpoint. As a further or alternative example, the threat index can form a basis for throttling bandwidth for network access by the endpoint. In certain implementations, the threat index can form a basis for limiting attachments (e.g., one or more of size, number, type) to emails at the endpoint. The threat index may be a scalar such that any one or more adjustments to respective aspects of the security policy are based on the scalar. Alternatively, the threat index may be a vector, and adjustments to one or more aspects of the security policy may be made individually according to respective components of the vector. In certain implementations, the threat index may be a color associated with the endpoint. As an example, a color of a process, a file, a network request, and so on may be based on a color of the threat index associated with the endpoint, and that color may be used in a security policy.

The adjustment may address any one or more of various different weaknesses exposed by the threat assessment failure. In particular, the adjustment may address the security weakness exposed by the user's interaction with the response object. In certain implementations, adjusting the security policy for the endpoint may include increasing detection sensitivity of one or more aspects of a threat management facility. For example, detection sensitivity may be increased for at least one of a static detection antimalware agent, a dynamic behavior antimalware agent, a firewall, a blacklist, and a whitelist. For severe vulnerabilities, this may include terminating or limiting network connectivity for a user, or limiting use of applications such as web browsers, electronic mail clients, or messaging clients that might otherwise expose a user to external threats. In some implementations, adjusting the security policy may include updating one or more security programs to a most recent version. Further, or instead, adjusting the security policy may include limiting at least one of application usage by the endpoint or network usage by the endpoint.

As shown in step 1124, the method 1100 may optionally include communicating an adjustment for a security policy for the endpoint to a network device, such as any one or more of the network devices disclosed herein. Thus, for example, the adjustment for the security policy for the endpoint may be communicated to any one or more of an endpoint (e.g., another endpoint), a firewall, and a wireless access point.

As shown in step 1126, the method 1100 may further or instead include restricting access to resources by the endpoint in response to the security policy. Thus, for example, as the security policy changes in response to the threat assessment failure, the accessibility to resources by the endpoint may change. In this way, therefore, the accessibility to resources by a given endpoint in the network may reflect a detected susceptibility of the user associated with the given endpoint to certain types of phishing attacks. Such targeted restrictions may be useful, for example, for reducing the likelihood of a successful phishing attack without unduly restricting a user's access to resources, such as resources that may have legitimate uses. For example, the endpoint may not be permitted to access domains on the internet based on URL that is communicated in an email and that has a low reputation.

While certain implementations have been described, other implementations are additionally or alternatively possible.

For example, while adjustments to the security policy have been described as being directed to a single endpoint associated with a user, it should be appreciated that other strategies for improving the security of a network are within the scope of the present disclosure. For example, the method 1100 may further include adjusting the security policy for one or more additional computing devices (e.g., endpoints) associated with the user.

As another example, while the security policies have been described as controlling interactions between the endpoint and objects based on the type of object, it should be appreciated that other types of security policies are within the scope of the present disclosure. As an example, the security policy may include evaluating a reputation of an e-mail and a reputation of a user (e.g., according to a threat index). Based on the reputation of the e-mail and the reputation of the user, the security policy can determine the parameters for interaction between the user associated with the endpoint and an object received in the e-mail. For example, in instances in which the object is a URL, the security policy can permit or limit access to the URL by the endpoint based on a reputation of the e-mail through which the URL was provided and based on a threat index of a user associated with the endpoint. As a specific example, a low reputation user can be blocked from accessing a URL received through an e-mail flagged as risky.

Figure 12:
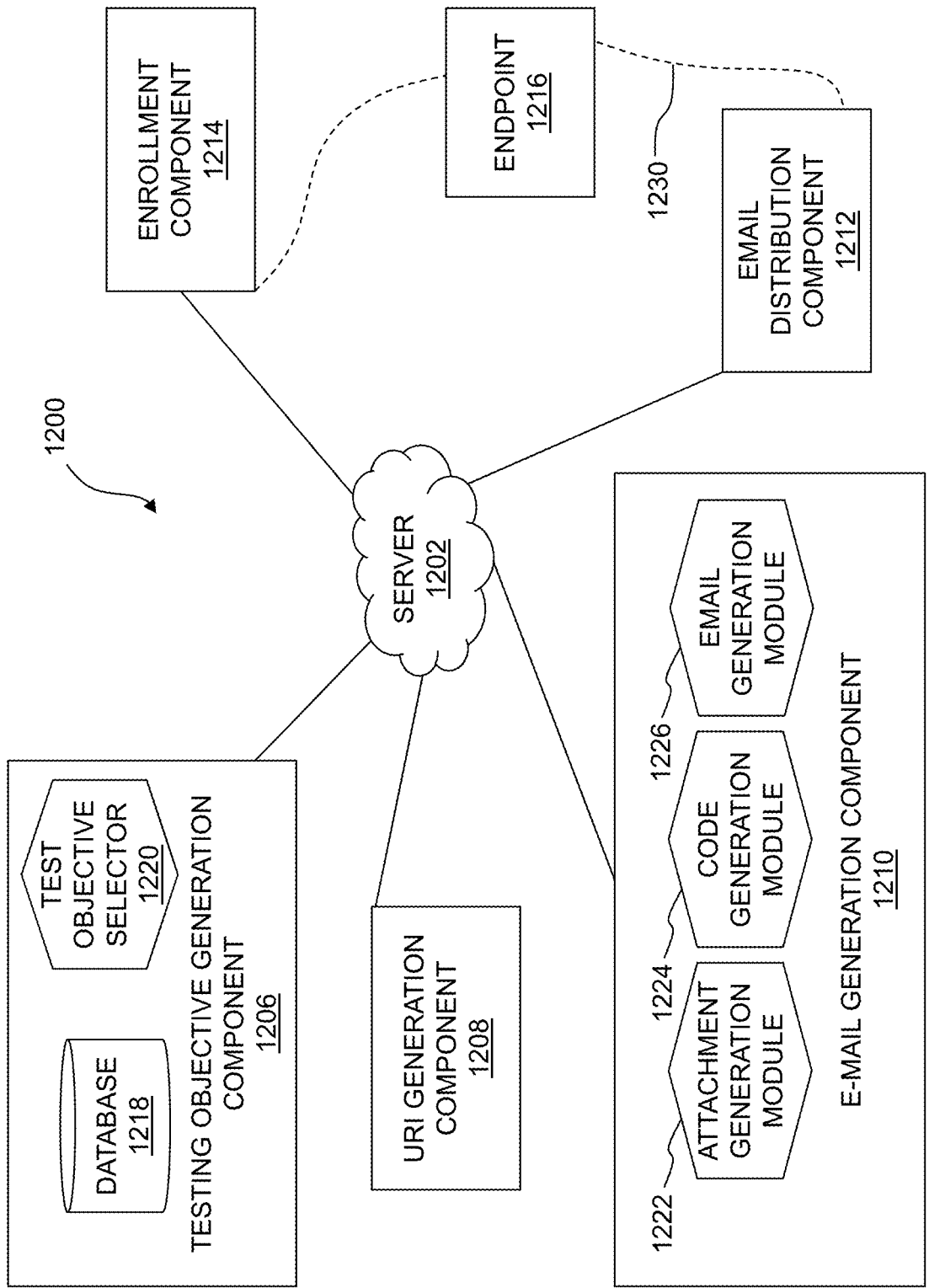
FIG. 12 illustrates an exemplary system for generating an attachment-based, simulated phishing attack.

As yet another example, referring to FIG. 12, a system 1200 for executing an email attachment based simulated phishing attack is illustrated. The system 1200 includes a server 1202 including a testing objective generation component 1206, a URL generation component 1208, an email generation component 1210, an email distribution component 1212, a training content enrollment component 1214, and an endpoint 1216 associated with a user. The server 1202 may operate according to the processor 212 and utilize the memory 214 of FIG. 2. The server 1202 may utilize the testing objective generation component 1206 to select an appropriate or desirable simulated testing objective. In some embodiments, the testing objective generation component 1206 may utilize a test objective selector 1220 in conjunction with a database 1218 to identify testing objectives. In certain embodiments, the database 1218 may include information about network users including, for example, demographic information like age and/or gender, and professional information like job title, job description, department, access levels, commonly utilized IT platforms, and the like.

By utilizing both the database 1218 and the test objective selector 1220 of the testing objective generation component 1206, the server 1202 may identify a suitable simulated testing objective. In certain implementations, once an objective has been identified, the server 1208 may generate a URI pointing to training content related to the determined test objective. In some embodiments, the URI may be a URL or any other network resource locator accessible by a user to reach the training content module.

Once the server 1202 has generated a URI at the testing objective generation component 1208, the email generation component 1210 may generate, on the fly, a customized attachment-based phishing email. It should be noted that the e-mail generation component 1210 may include individual modules such as one or more of an attachment generation module 1222, a code generation module 1224, and an e-mail generation module 1226. Generation of e-mails by the e-mail generation component 1210 may include generating a document via the attachment generation module 1222. In some embodiments, this document may be a Microsoft Office document like a Word, Excel, or PowerPoint document. Other attachment formats are additionally or alternatively possible. For instance, in some embodiments, the attachment generation module 1222 may generate a document of a file type frequently accessed by the user 1216 in the ordinary course of business, such as an accounting file, an archive file, a database file, or any other file type attachable to an electronic communication (e.g., email, instant message, SMS message, or other electronic message broadcast). While the modules 1222, 1224, 1226 are illustrated as separate, it should be appreciated that one or more of the modules 1222, 1224, 1226 may be combined with one another or a single module may be configured to perform multiple tasks.

The attachment generation module 1222 may also, or instead, interact with the code generation module 1224 during the attachment generation process. The code generation module 1224 may, for example, generate executable code incorporable into the attachment file by the attachment generation module 1222. It should be noted that the executable code may be generated separately from the attachment document itself and then embedded within the document at a later time or the attachment generation module 1222 may use the code generation module 1224 to generate the attachment and embed the code in a single action. In general, the code may be configured to execute arbitrary code on the computing system of the endpoint 1216 associated with the user in the event that the user opens the attached document. In certain embodiments, such arbitrary code may launch a web browser and load the URI generated by the URI generation component 1208. In some embodiments, the URI point to a local network resource accessible outside of a web-browser. In such embodiments, the executable code may be configured to cause the computing system of endpoint 1216 to load the local network resource in a suitable manner (e.g., in a system file browser or other pre-installed software on user 216s computing system).

The code generation module 1224 may incorporate the URI—in whatever form it is created by the URI generation component 1208—into the executable code to be utilized by the attachment generation module 1222. Additionally, or alternatively, the code generation module 1224 may utilize a unique user identifier in conjunction with the URI to uniquely identify the user associated with the endpoint 1216 when a threat assessment is failed by opening the attached document and allowing execution of the arbitrary code.

In some embodiments, the unique ID may also be generated at the URI generation component 1208 during, for example, the initial URI generation step. Alternatively, or in addition, the email generation component 1210 may incorporate the unique identifier into the executable code and embedded within the attachment document, as described above. Further, in some embodiments, the unique identifier may be provided by the database 1218 during, for example, generation of the testing objective. Still further or instead, one or more of the URI generation component 1208, and the e-mail generation component 1210 may generate a unique identifier for each user, depending on which component is utilized to identify the unique ID.

The unique ID may be beneficial in these embodiments because, for example, it facilitates directly tracking the user by the system when a threat assessment is failed. Additionally, or alternatively, by incorporating a unique ID into the URI component, certain capabilities may be enabled at the network location corresponding to the URI that would not be enabled otherwise. For instance, a unique ID may facilitate customization of the landing location to the user in a manner such as adding the user's name or other user specific information derived from, for instance, the database 1218. In some embodiments, the unique ID may be useful for directly or automatically enrolling the user in customized training content, rather than requiring the user to otherwise reach the generic URI location and then perform a registration or other self-identification process.

Based on the generation and addition of the unique ID to the URI at the code generation module 1224, the email generation component 1210 may generate an email (or, in some embodiments, an alternative type of electronic communication) at the email generation module 1226 and attach the document and embedded code with the unique identifier to the email. In some embodiments, the email generation module 1226 may include instructions within the appropriate email body area to the user associated with the endpoint 1216, with the directions directing the user to open the attached document. Such instructions may be customized to the user using, for example, information derived from the database 1218 about the user, from some other data store, or both. In some embodiments, personal information about the user, the user's job, the user's job responsibilities, or other information that is designed to strengthen the asserted validity of the simulated attack may be included. As will be discussed in further detail below with respect to FIG. 13, learning algorithms may determine certain types or examples of customizations that have been effective on other users and apply predictions regarding similar customizations that may be effective for simulation of a phishing threat directed to the present user.

Once an email with an attached document has been generated as discussed above, the email may be distributed by the server 1202 through the email distribution component 1212 (to the particular user identified by the unique identifier) over the network 1230. The network 1230 may be an internal network or external network. Further, the email may be delivered to the user on any of a plurality of devices (e.g., the endpoint 1216). Depending on the format of the email attachment, the effectiveness of the simulated phishing attack may be different on different devices. For that reason, the email generation component 1210 may utilize the attachment generation module 1222 to create an attachment formatted for a specific device or may choose an attachment formatted for more than one device, depending on the determination made by the testing objective generation component 1206.

Upon opening the attached document and execution of the embedded code, the endpoint 1216 associated with the user would be caused to load the enrollment component 1214 located at the URI embedded within the attachment. Further, because the URI also includes the unique identifier, the enrollment component 1214 may automatically enroll the user associated with the endpoint 1216 in the training content associated with the URI, which may be associated with the type of simulated attack the user failed and, thus, the type of simulated attack for which the user has demonstrated a training need.

Finally, after auto enrollment of the user in the training content, in some embodiments the enrollment component 1214 may communicate with the server 1202 to report on the user's enrollment in training and, further or instead, to provide specifics of the training content and route taken by the user to reach failure. In some embodiments, this information may be stored in the database 1218 and, at a later date, may form a basis for generating new testing objectives for the same user. Alternatively, or in addition, the data may be stored in the database 1218 to provide an analytical dataset that may form a basis for generating testing objectives for users other than the user associated with the endpoint 1216.

In certain implementations, a method for enrolling a user in customized, computer-based training as the result of a failed simulated threat assessment may include selecting at least one detectable security weakness for at least one user. A unique enrollment URL for a threat assessment training content may be generated. The URL may identify, at a first computing system (e.g., the server 1202), the location of an automated enrollment platform for training content. Additionally, or in the alternative, the training content may be directed at least to the predicted security weakness associated with the user.

Based on at least the predicted weakness, an electronic communication may be generated and customized for the user being testing. The electronic message may include at least an attached document of a file type appropriate for the user. Additionally, the attached document may include executable code embedded within. The executable code may be configured, for example, to load the unique enrollment URL and the user identifier when the attached document is opened. Further, the opening of the attachment and the execution of the code may constitute an indication from the endpoint 1216 to the server 1202 that a threat assessment failure has occurred.

The customized email including the attached document may be sent to the user by way of any suitable electronic messaging format. Based on the unique threat assessment training content URL being loaded on the user computing system (indicating a threat assessment failure), the user identifier may be automatically provided with access to view the training content associated with the corresponding security weakness.

The progress of the user identifier may be tracked through utilization of the training content and the user may, optionally, be retested for adherence to the training content. Alternatively, or in addition, the user may be tested on a different predicted security weakness.

In some embodiments, the electronic communication may further, or instead, include user readable text including at least an instruction to open the attached documents. For example, such a message may be customized to appear to originate from a trusted source such as a manager, IT department employee, or other known system from which or from whom the user is accustomed to receive electronic messages.

Figure 13:
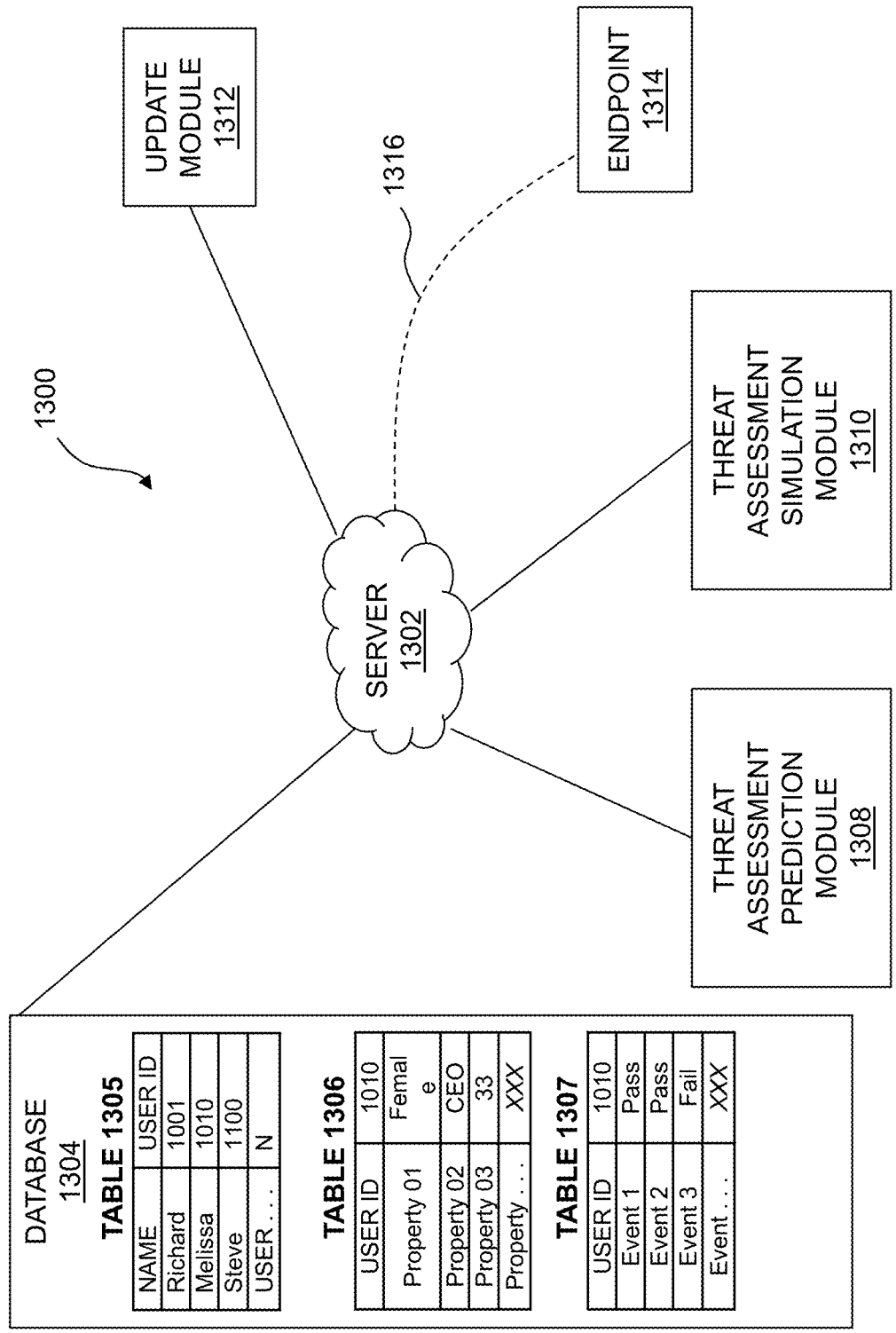
FIG. 13 illustrates an exemplary system for predicting a testable threat vector or a computer system user based on known user properties and associated known threat outcomes.

FIG. 13 illustrates a system 1300 for predicting a testable threat vector or a computer system user based on known user properties and associated known threat outcomes. For example, the system 1300 may predict a suitable test event directed at user associated with an endpoint 1314. In system 1300, a server 1302 may include a database 1304 including tables 1305, 1306, and 1307. The server 1302 may further include one or more of a threat assessment prediction module 1308, a threat assessment simulation module 1310, and an update module 1312. A user associated with the endpoint 1314 may interact with the system 1300 over a network 1316.

The threat assessment prediction module 1308 may utilize one or more of the tables 1305, 1306, and 1307 to generate predictions as to what types of simulated threat assessments would be most likely to exploit the user associated with the endpoint 1314 by applying one or more pattern recognition algorithms to data stored, for example, in the database 1304. For example, the threat assessment prediction module 1308 may consult the table 1305 to derive information about a particular user. In such embodiments, the tables 1306 and 1307 may be keyed to the table 1305 through, for example, a User ID field. Based on such keying, relational database techniques may be used to store different sets of data about a given user across multiple tables. For example, the threat assessment prediction module 1308 may query the table 1305 for a user (e.g., a user named "Melissa"), and a user ID (e.g., "1010") may be returned. The threat assessment prediction module 1308 may then cross reference the given user ID against the table 1306 to determine one or more properties about the user. In this specific example, properties 01, 02, and 03 may be provided. The property labeled "Property . . . " may be a place holder to represent that any number of properties may be stored in the table 1306 within the bounds of the particular database technology deployed.

When the table 1306 is queried, the properties of "Female," "CEO," and "33" may be returned. Properties within the table 1306 may include items related to the demographics of a user, such as gender, age, education, or other demographic information. The properties may also, or instead, include properties related to the user's job details, such as job title, job function, access levels, commonly used platforms, etc. Providing user-level details such as these may result in at least two substantial benefits. First, the particular simulated threat for a user can be customized to the degree that details are provided about the user. That is, in general, the greater the level of detail, the more customization may be provided. Second, with more substantial user level data sets, better predictions may be available when those data items are compared to simulated threat outcomes. For instance, users having common properties "A" and "B" may be presented with the same simulation. In some cases, a first user may fail the simulation while a second user passes the simulation. Limited only to properties "A" and "B," it may be difficult to derive any understanding regarding why the first user failed the simulation while the second user did not. It should be appreciated, however, that knowledge of a greater number of properties about each user, may increase the likelihood that one or more of the additional properties will differ among the two users. These differences may provide a basis for predicting future outcomes to similar simulations, especially in implementations based on larger data sets containing substantially more users with substantially more properties.

In the threat assessment prediction module 1308, the table 1307 may also, or instead, be accessed to learn about past threat event outcomes. In such implementations, the table 1307 may include three event outcomes for the user 1010 including "Pass" for "Event 1" and "Event 2" and "Fail" for "Event 3." In FIG. 13, it should be appreciated that the row including "Event . . . " is a place holder for the sake of clarity of representation and represents that any number of events may be stored in the table 1307 within the bounds of the particular database technology deployed.

Once a particular threat prediction has been identified by the threat assessment prediction module 1308 for the user associated with the endpoint 1314, a corresponding simulated threat assessment may be generated by the threat assessment simulation module 1310. The threat assessment simulation module 1310 may, for example, generate a simulation in accordance with any one or more of the various procedures described herein, including any one or more of the various different procedures described above with respect to FIG. 12, or the simulation may be generated in another way. Based on the particular embodiment, the threat assessment simulation module 1310 may generate a threat simulation in accordance with the identified prediction and, further or instead, may transmit that simulation to the endpoint 1314 associated with the user.

Upon interaction with the simulated threat by the user associated with the endpoint 1314, the server 1302 may receive a simulation outcome over the network 1316. Because the simulation was custom-built for the particular user, the outcome of the simulation may now be tied back to the corresponding user ID from the table 1305 by storing the outcome in the table 1307. In some embodiments, the update module 1312 may take the simulation outcome from the user 1314, query the database 1304 for a matching User ID (included within the simulation by the threat assessment simulation module 1310), and cause the database 1304 to be updated at the corresponding tables 1305, 1306, and 1307.

The threat assessment prediction module 1308 may again query the newly updated database, applying pattern recognition algorithms to identify likely simulation types and user targets for those simulations.

In accordance with the systems described herein and, in particular in accordance with the system 1300, a method for determining a threat assessment metric for a user may include accessing a database including a plurality of records including at least one property associated with a user identifier and associated with at least one threat assessment performance outcome that has been stored as a result of a threat assessment event.

The threat assessment prediction module 1308 may derive one or more threat assessment prediction profiles by applying one or more pattern recognition algorithms to the plurality of records of the database 1304. Such algorithms may include, for example, probabilistic inferences, anomaly detection, decision trees, training data sets, clustering, or any other suitable technique known in the art for analyzing data sets for predictive models.

After at least one prediction profile has been derived, a first plurality of properties may be determined for a first user. Based on those properties and on the assessment prediction profile, the first user may be assigned an initial threat assessment metric identifying at least one predicted threat vector for the first user.

Based at least on the initial threat assessment metric assigned to the first user identifier, a simulated threat assessment event, configured to test the first user identifier on at least the predicted threat vector, may be executed.

Based on the outcome of the simulated threat assessment event, at least one or more of the following may occur: the simulated threat assessment outcome may become associated with the first plurality of properties for the first user; an updated threat assessment metric for the first user may be generated by reapplying one or more of the threat assessment prediction profiles to the updated first plurality of properties; and the updated first plurality of properties for the first user may be added to the plurality of records of the database.

In some embodiments, the threat assessment prediction module 1308 may query each of the tables 1305, 1306, and 1307 of the database 1304 and apply pattern recognition algorithms seeking to find common event outcomes in the table 1307 based, for example, on the associated properties of the table 1306. For instance, the threat assessment prediction module 1308 may determine that a disproportionate number of users with the property of "Female" and an age greater than "30" fail "Event 3."

Based on a result of the prediction and continuing with this example, if a new user with properties that include "Female" and "30" is added, the threat assessment simulation module 1310 may be configured to test the new user with a simulated event already determined appropriate for the new user based on her properties. In this way, the efficiency of the simulation system may be increased by eliminating, for example, the steps that would otherwise be involved with ascertaining the new user's threat characteristics solely through a trial and error process involving randomized or otherwise un-customized assignments of simulated tests. Such an improvement in efficiency of the simulation system may, for example, improve the security of the network 1316.

Figure 14:
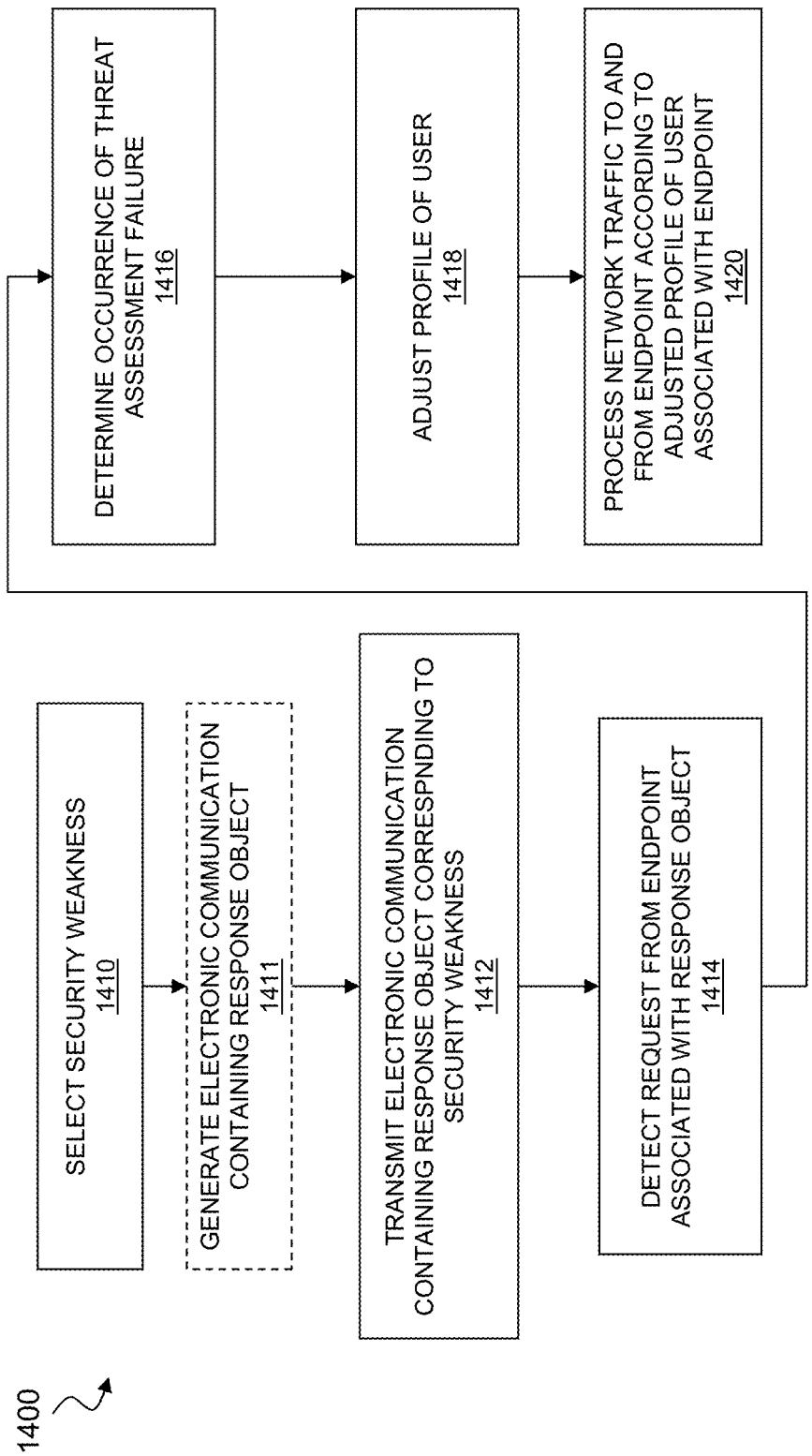
FIG. 14 is a flow chart of an exemplary embodiment of a method for securing a computer network based on processing network traffic to and from an endpoint according to monitored behavior of a user associated with the endpoint.

FIG. 14 is flow chart of an exemplary embodiment of a method 1400 for securing a computer network based on processing network traffic to and from an endpoint according to monitored behavior of a user associated with the endpoint. In general, the exemplary method 1400 may be implemented by any one or more of the threat management facilities disclosed herein and in a communicating relationship (e.g., via a heartbeat system, such as the heartbeat system 314 in FIG. 3) with one or more endpoints coupled to an enterprise network. Further, as described in greater detail below, the exemplary method 1400 implemented on such threat management facilities as those described herein may facilitate management of groups of users with the same or similar demonstrated behavior, resulting in efficient use of network administrator resources while avoiding or eliminating the need for overly restrictive policies dictated by the riskiest users.

As shown in step 1410, the exemplary method 1400 may include selecting a security weakness for users of an enterprise network. In general, the security weakness may represent one or more one or more potential exploits that a third-party uses to gain unauthorized access to and/or to compromise the enterprise network. Thus, for example, the security weakness may include vulnerability of users of a network to phishing threats or to other social engineering threats. The security weakness may, further or instead, include missing security updates on endpoints within the enterprise network.

The selection of the security weakness may be made according to any one or more of various different criteria suitable for a particular implementation. Examples of such criteria may include, but are not limited to, recent types of successful or unsuccessful attacks on the enterprise network, discovery of new types of attacks, recent training associated with certain types of attacks, recent software upgrades/changes, turnover of users of the enterprise network, and the like. As a specific example, therefore, an increase in e-mail phishing attacks on the enterprise network may lead to selecting e-mail phishing attacks as the security weakness against which users of the network are to be tested. More generally, the selection criteria may be customized by the network administrator to suit the security needs of a particular enterprise network at any given time. At the same time, the selection of the security weakness may include a selection on an enterprise basis, a group basis, or an individual basis. Thus, for example, where a particular user has caused one or more security breaches due to an observed susceptibility to phishing attacks, the selection of the security weakness may target a particular machine or account associated with that user and test for phishing vulnerability. Similarly, where a group of users such as users within an organizational department or a geographical location have habitually slow or poor software update practices, the selection of the security weakness may target that group and test for vulnerabilities associated with outdated software.

As shown in step 1411, the exemplary method 1400 may, optionally, include generating electronic communications containing a response object. As discussed above, the response object may be targeted at a particular user or group, or may be directed at all users or endpoints associated with an enterprise. Generating the electronic communications may include any manner and form of generating electronic communications suitable for assessing a particular type of security weakness. For example, generating the electronic communications may include customizing each of a number of electronic communications for at least one of a name, a user identifier, a title, or an organizational role of one of the users of the enterprise network. Such customization may be useful for, among other things, emulating electronic communications associated with sophisticated phish threats, which may build upon information garnered about the user from other sources, such as through social engineering or access to databases or other repositories of user and organizational information within the enterprise network.

While customization of the electronic communications may be used in certain implementations, it should be appreciated that the electronic communications may also or instead be substantially identical to one another in certain instances. Identical communications may be useful, for example, for rapidly deploying a threat assessment across an enterprise. As another example, identical communications may be useful for emulating certain types of attacks, such as unsophisticated attacks directed at all of the users of the enterprise network.

The response object may take a variety of forms. For example, the response object may include a URL, hyperlink, or other reference to external content so that, when a user locally selects the reference, an endpoint responsively creates a request to the referenced location (e.g., to the URL, network address, or other reference) in order to retrieve and locally present associated content, such as through a browser or within a document displayed in some other application. In another aspect, the response object may include a beacon or other signal that is actively communicated from the endpoint to an appropriate receiver such as a threat management facility, which can in turn remediate or otherwise manage the endpoint (and/or the user) consistent with the risky behavior associated with the response object. In another aspect, the response object may include human readable text, graphics or the like that instruct a user to take a certain action, e.g., send an electronic mail, make a telephone call, send a text message or the like. In this context, it should be appreciated that a request from an endpoint associated with the response object may include a human action that does not include the endpoint, such as sending an SMS message from a cellular phone, but is based on information within the response object that is received at the endpoint and acted upon by a user of the endpoint.

As shown in step 1412, the exemplary method 1400 may include transmitting electronic communications to the users of the enterprise network. The electronic communications may be, for example, any one or more electronic communications associated with assessing user vulnerability to threats such as phishing threats. Examples of electronic communications transmitted to the users may include e-mails, pages (e.g., pop-up ads), audio or video presented on an Internet browser, text messages, VoIP calls or the like. In certain implementations, the electronic communications may be transmitted to the endpoints associated with the users. Additionally, or alternatively, the electronic communications may be transmitted to one or more computing devices associated with the users, or in the case of a targeted electronic communication, to a number of devices associated with a particular user. As an example, the electronic communications include text messages sent to smart phones associated with the users. As a more specific example, in the case of emulation of certain types of Short Message Service (SMS)-based phishing attacks, text messages sent to smart phones associated with the users may direct the user to take an action corresponding to a high-risk behavior.

In general, the electronic communications may be transmitted to the users according to any one or more of various different criteria. While the selection of users for receiving the electronic communications may be random, it should be appreciated that the users may further, or instead, be selected to receive the electronic transmissions according to any one or more criteria useful for identifying potential threats to the enterprise network. For example, the electronic communications may be transmitted to all users of the enterprise network, which may be useful for establishing an initial baseline of user behavior. Continuing with this example, the electronic communications may be transmitted to the all of the users at the same time or, in certain instances, in stages (e.g., by department, facility, alphabetically, etc.) on a rolling basis. As an additional or alternative example, the electronic communications may be targeted toward certain users based on one or more triggers. Examples of triggers may include, but are not limited to, users that are members of a group, users with particular characteristics, users associated with a color, users that have exhibited certain behavior, users with weak network passwords, users with old passwords, users who have recently successfully or unsuccessfully completed network security training, new users, users in a specific department, users at a specific facility, or users previously identified as high-risk users based on, for example, a history of actual or potential security breaches, slow or poor software update practices, or prior responses to internal testing for phishing vulnerabilities. Thus, it should be appreciated that, depending on the trigger criteria used for transmitting the electronic communications, certain users may receive the electronic communications more frequently than other users.

While the electronic communications may be transmitted directly to endpoints or network devices associated with users of the enterprise network, it should be appreciated that the electronic communications may include any manner and form of presenting information of unknown or questionable provenance to the endpoint, in much the same way that genuine phishing threats are presented. Thus, transmitting electronic communications may further or instead include simulation of a physical attack involving non-transitory computer storage media (e.g., a USB thumb-drive, an external hard drive, or the like). In such implementations, the response object may be carried on the storage media, and the storage media may be left in a physical location (e.g., a parking lot), where the storage media may be found by the user. Transmission of the electronic communications may occur when a user, having come into possession of the storage media, connects the storage media to an endpoint.

In certain implementations, the electronic communications may contain a response object corresponding to the security weakness. For example, the response object may be a Uniform Resource Locator (URL). Additionally, or alternatively, the electronic communications or the response object may include at least one of an attached document, a user identifier, and executable code embedded within the attached document. Continuing with this example, the executable code may include instructions for one or more processors of the endpoint to transmit a beacon and the user identifier from the endpoint to a threat management facility when the attached document is opened. Further, or instead, the electronic communications may include human readable text including an instruction to the user to open the attached document or, more generally, to engage in behavior that creates risk for the enterprise network and is detectable by a threat management facility of the enterprise network.

As shown in step 1414, the exemplary method 1400 may include detecting a request from an endpoint associated with the response object. In general, the request may correspond to one or more behaviors detectable by the threat management facility and associated with high-risk activity in the context of the security weakness being assessed. For example, returning again to the example of the response object as a URL, a request to the URL (e.g., clicking on a link to retrieve associated content) by the endpoint may be detected by a threat management facility of the enterprise network. Additionally, or alternatively, detecting the request may include determining whether a file has been opened on an end point. More generally, the request associated with the object may include any one or more of the various different detectable behaviors described herein.

As shown in step 1416, the exemplary method 1400 may include determining that a threat assessment failure related to the security weakness has occurred based on detecting the request associated with the response object from the endpoint. In certain implementations, determination of the threat assessment failure may be based on detection of the request alone. In such implementations, the determination that the threat assessment failure has occurred may be binary (amounting to a pass/fail determination). It should be appreciated, however, that additional or alternative information may be used as a part of the determination of the threat assessment failure. That is, the evaluation of the threat assessment failure may be graded to reflect that certain types of threat assessment failures represent greater risks than other types of threat assessment failures. For example, the determination of the threat assessment failure may account for whether the user forwarded the communication to other users within the enterprise network. As another example, where relatively low-risk behavior is continually repeated by a user or endpoint, this may nonetheless pose a substantial risk to the enterprise. Thus, the determination of the threat assessment failure may account for the number of times the user has taken a type of action (e.g., failed threat assessments) within a period of time.

As shown in step 1418, the exemplary method 1400 may include, for a user associated with the endpoint, adjusting a profile of the user based on a determination that the threat assessment failure occurred. In general, the profile of the user may be based at least in part on the user's performance with respect to threat assessments and, in certain implementations, may be further based on any one or more other user risk assessments described herein. Adjusting the profile of the user based on the threat assessment failure may include changing any one or more of various different user-specific parameters associated with securing the enterprise network. For example, adjusting the profile of the user may include increasing detection sensitivity for at least one of a static detection antimalware agent, a dynamic behavior antimalware agent, a firewall, a blacklist, and a whitelist. In some instances, adjusting the profile of the user may include adjusting an endpoint-specific security policy. Further, or instead, adjusting the profile of the user may include adjusting a security policy for one or more additional computing devices associated with the user such that the adjusted policies follow the user to other computing devices on the enterprise network.

In certain implementations, adjusting the profile of the user may include adding or removing the user from a group of users. Each group may have an associated policy such that adding or removing the user from a particular group of users adjusts the profile of the user implicitly by imposing a security profile or security attributes associated with the new group. More specifically, adjusting the profile of the user may include associating the user with a group of users corresponding to the threat assessment failure, and this group may be subject to certain network restrictions that are not applied to users outside of the group. As compared to managing users individually, grouping users corresponding to the threat assessment failure may facilitate more efficient use of administrator resources. For example, as described in greater detail below, grouping users corresponding to the threat assessment failure may facilitate group management of security threats within an administrator interface or the like. Further, or instead, as compared to managing all of the users according to a single policy that may be overly restrictive (such as a policy intended to protect the network from activity undertaken by high-risk users), grouping managing users or groups according to associated threat assessment failures facilitates distribution and control of permissions appropriate for each user of the enterprise network.

As shown in step 1420, the exemplary method 1400 may include processing network traffic to and from the endpoint according to the adjusted profile of the user associated with the endpoint. As used in this context, processing network traffic should be generally understood to include any manner and form of managing network traffic to and from a network endpoint to reduce the likelihood of propagating a threat within the enterprise network and/or propagating a threat to resources beyond the enterprise network. Thus, unless otherwise specified or made clear from the context, processing network traffic to and from the endpoint should be generally understood to include processing network traffic according to any one or more of the methods described herein. For example, the network traffic may be processed according to one or more security policies.

In certain instances, processing the network traffic to and from the endpoint according to the adjusted profile of the user may include restricting access of the endpoint to other resources on the network or restricting network traffic between the endpoint and one or more resources outside of the enterprise network. In another aspect, processing the network traffic may include coloring network packets from the endpoint according to the adjusted profile of the user associated with the endpoint or a risk profile associated with the user. This may, for example, include a general risk assessment or score for the user, general or specific policy restrictions for the user (or a risk score for the user), or specific, known vulnerabilities of a user or the endpoint. These techniques may also or instead be used in combination. For example, processing may include coloring network packets according to a risk score, and then processing packets according to the risk score at one or more network devices within the enterprise network. This approach advantageously permits management of network traffic by a network device based on empirical riskiness of an endpoint (or a user of the endpoint) without a need to track individual messages or network packets back to a source.

The network traffic may be processed at one or more of an endpoint, a firewall (such as an endpoint firewall or a firewall of an enterprise gateway), a wireless access point, or any other network device or portion of the enterprise network through which the network traffic may pass. As an example, a gateway of the enterprise network may restrict network traffic between the endpoint and certain websites (or categories of websites). In another aspect, an endpoint firewall may prevent or limit use of text messaging to and from and endpoint, or an electronic mail server may prohibit or limit communications based on the corresponding mail addresses.

In certain implementations, restricting network traffic to and from the endpoint according to the adjusted profile of the user associated with the endpoint may include decreasing a quarantine threshold associated with e-mails sent to the endpoint. Thus, e-mails sent to high-risk users may be more likely to be quarantined than similar types of e-mails sent to lower-risk users. The quarantine threshold may be based on one or more parameters associated with e-mail communication, examples of which include attachment type, attachment size, forwarded e-mails, senders, etc. This quarantine may be enforced, e.g., at an electronic mail server for the enterprise, at a gateway for the enterprise network, at a firewall for the endpoint, or at any other suitable network device or location.

As an additional or alternative example, restricting network traffic between the endpoint and one or more resources outside of the enterprise may include restricting bandwidth of such communication.

Returning to the example of adding or removing the user from a group of users, processing the network traffic may include applying, to the network traffic, a policy associated with the group of users. The policy may be any one or more of the various different types of policies described herein. Thus, for example, the policy may be one or more of an endpoint-specific policy or a policy for a gateway. Further, or instead, the policy may be a user-based policy applicable to the user at the endpoint and may follow the user to other devices on the network.

In general, processing network traffic according to policies associated with groups of users facilitates group-based administration of a large number of users on the enterprise network. That is, the number of policies requiring administration may be managed to a suitable number based on criteria selected for membership in the groups. More generic criteria applicable to a large number of users may be useful for reducing the number of policies required to be managed but—based on considerations associated with the highest risk users in the group—may be overly restrictive. Conversely, more specific criteria applicable to a smaller number of users may reduce the likelihood of unnecessary restrictions but may increase the number of policies required to be managed. At the same time, certain policies may be widely applicable, while one or a few users, such as particular, chronically risky network users or presumptively safe network administrators, may have highly specific requirements. The appropriate balance of considerations associated with the criteria used for grouping users may be highly specific to a given enterprise network. Accordingly, as described in greater detail below, the groups of users described herein and the policies associated with such groups may be managed (e.g., customized) by a network administrator through a graphical user interface.

While the foregoing description focuses on the manner in which network communication is processed, it will be understood that risk assessments and coloring may be used to facilitate other types of processing consistent with managing security of endpoints in an enterprise network, and all such variations are intended to fall within the scope of this disclosure. Thus, for example, where a user or endpoint is demonstrably predisposed to a certain type of risky behavior, as measured through interactions with response objects, local processes or data on the endpoint may be colored with corresponding risk information. This may facilitate improved local threat detection, such as by coloring a browser process or an electronic mail process to reflect corresponding riskiness according to a known risk profile of the user. Similarly, sensitive or confidential data may be colored to reflect the known risk profile so that interactions with the data can be detected and additional, precautionary steps can be taken before permitting the user to expose such data outside the endpoint. Similarly, as discussed below, an administrator may usefully review measured risk profiles in order to control a frequency or type of testing for particular endpoints and/or to manage groups of endpoints according to similarity of risk profiles.

Figure 15:
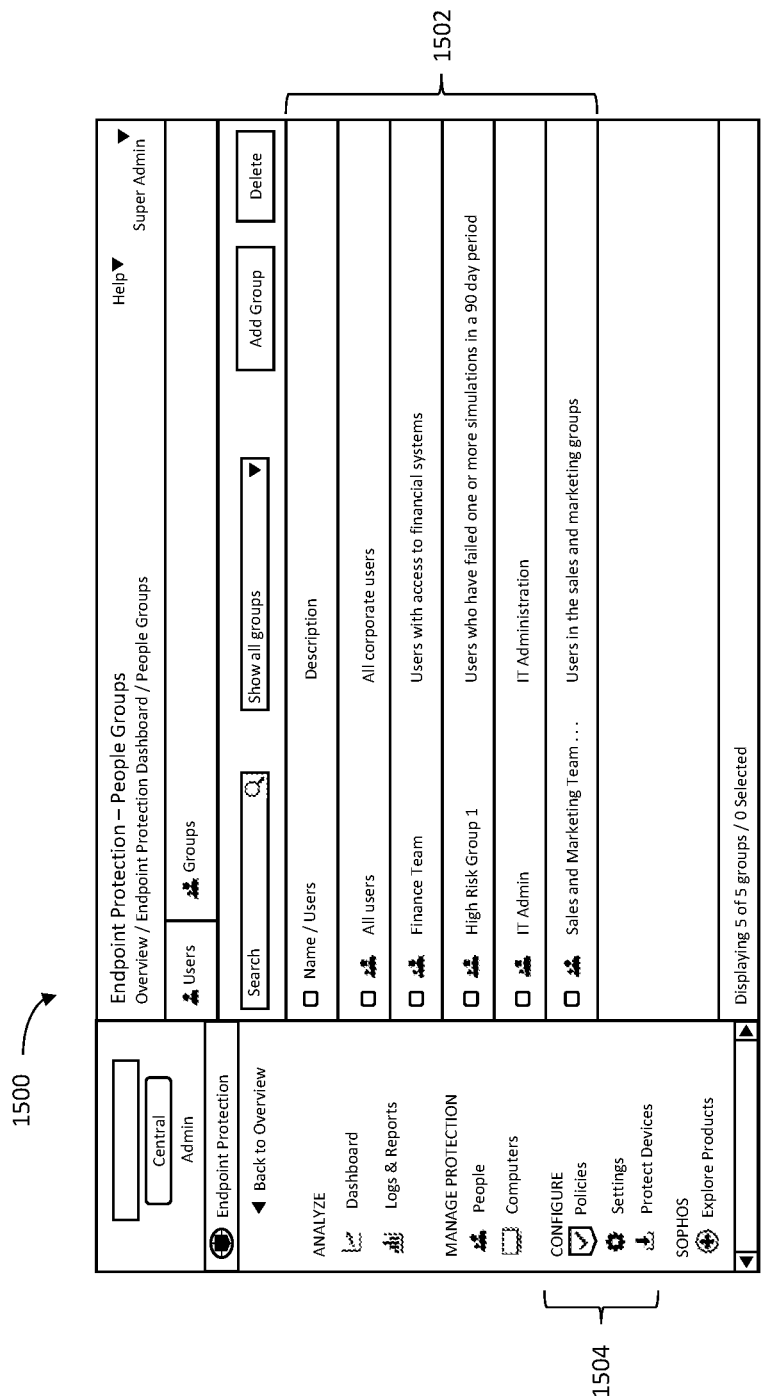
FIG. 15 is a schematic representation of a user interface associated with administrating groups of users.

FIG. 15 is a schematic representation of a user interface 1500 associated with administrating groups 1502 of users. The user interface 1500 may be used in certain implementations of the exemplary method 1400 (FIG. 14). For example, adjusting the user's profile (e.g., according to step 1418 in FIG. 14) may include adding or removing the user from the one or more groups 1502. As a more specific example, upon determining that the user has failed one or more threat assessments within a predetermined period (e.g., 90 days), adjusting the user's profile may include adding the user to a high-risk group. Further, or instead, the user may be added or removed from the one or more groups 1502 according to other criteria customizable by the network administrator.

In certain instances, a user may be added to a particular one or more of the groups 1502 associated with a job function of the user. As an example, users in a finance department may be grouped together. Network traffic associated with users in the finance group may be processed according to a policy suitable for allowing users in the finance department to carry out finance related tasks.

Users may be automatically sorted into the groups 1502 according to criteria available in a database. Automatic sorting of this type may be particularly useful for managing a large user population and/or a user population with a large number of changes. The database may be synced with an active directory of users. Further, or instead, the database may include information imported from one or more lists. In certain implementations, the network administrator may additionally or alternatively manually add or remove or more users to any one or more of the groups 1502 (e.g., through one or more drag-and-drop operations carried out in the user interface 1500). Manually adding or removing users to one or more of the groups 1502 may be useful, for example, to remove a user from a group associated with a policy incompatible with the user's job function, or to permit an administrator to group a user based on observed responses to test response objects as discussed above.

The user interface 1500 may include one or more configuration menus 1504 from which a network administrator may associate certain attributes with each of the one or more groups 1502. In general, the one or more configuration menus 1504 may include any one or more parameters described herein with respect to processing network traffic to and from endpoints associated with users in the enterprise network. As an example, the one or more configuration menus 1504 may include parameters related to restricting bandwidth for certain ones of the groups 1502, such as a group associated with threat assessment failure within a given time period. Further, or instead, the one or more configuration menus 1504 may include parameters associated for changing the time period associated with aging users out of a high-risk group (e.g., 30 days without a threat assessment failure, 60 days without a threat assessment failure, etc.).

While the configuration menus 1504 may correspond to parameters associated with processing network traffic to and from endpoints, it should be appreciated that the configuration menus 1504 may additionally or alternatively include parameters related to other aspects of securing an enterprise network from phishing threats or other types of threats. Thus, for example, devices may be associated with a user, and devices associated with a user may be controlled through policies that are set in the user interface 1500. Also, for example, the configuration menus 1504 may include parameters corresponding to depth and frequency of scans performed on endpoints in a given one of the groups 1502, or type or frequency of retesting members within the group for behavioral vulnerabilities. That is, through the configuration menus 1504, a network administrator may increase a frequency and/or depth of scanning or testing of endpoints associated with users in high-risk groups.

Transmission media may include a network and/or data links which may be used to carry program code in the form of computer-executable instructions or data structures, and which may be accessed by a general-purpose or special-purpose computer system. As used herein, a "network" should be understood to include one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be understood to be included within the scope of computer-readable media.

Further, upon reaching various computer system components, program code in the form of computer-executable instructions or data structures may be transferred automatically from transmission media to computer storage media (or vice versa). For example, computer-executable instructions or data structures received over a network or data link may be buffered in RAM within a network interface module (e.g., a "NIC"), and then eventually transferred to computer system RAM and/or to less volatile computer storage media at a computer system. Thus, it should be understood that computer storage media may be included in computer system components that also (or even primarily) utilize transmission media.

Computer-executable instructions may include, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that, unless otherwise specified or made clear from the context, any one or more of the methods described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, virtual or augmented reality headsets, and the like. It should be further understood that any one or more of the methods described herein may also or instead be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that any one or more of the methods described herein may be implemented in a cloud computing environment. Cloud computing environments may be distributed, although this is not required. When distributed, cloud computing environments may be distributed internationally within an organization and/or have components possessed across multiple organizations. As used herein, "cloud computing" should be understood to include a model for enabling on-demand network access to a shared pool of configurable computing resources (e.g., networks, servers, storage, applications, and services). Further, or instead, "cloud computing" may result in any of a number of other advantages that may be obtained from such a model when properly deployed.

A cloud computing model may be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud-computing model may also, or instead, be deployed using different deployment models such as private cloud, community cloud, public cloud, hybrid cloud, and so forth.

Some embodiments, such as a cloud computing environment, may include a system that includes one or more hosts that are each capable of running one or more virtual machines. During operation, virtual machines may emulate an operational computing system, supporting an operating system and perhaps one or more other applications as well. In some embodiments, each host may include a hypervisor that emulates virtual resources for the virtual machines using physical resources that are abstracted from view of the virtual machines. The hypervisor may also, or instead, provide proper isolation between the virtual machines. Thus, from the perspective of any given virtual machine, the hypervisor may provide the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

Computer storage media shall be understood to include physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method of securing a computer network, the method comprising:
    selecting a security weakness for users of an enterprise network;
    transmitting electronic communications to the users of the enterprise network, the electronic communications containing a response object corresponding to the security weakness;
    detecting a request from an endpoint associated with the response object;
    determining that a threat assessment failure related to the security weakness has occurred based on detecting the request from the endpoint;
    for a user associated with the endpoint, adjusting a profile of the user based on a determination that the threat assessment failure occurred, wherein adjusting the profile of the user includes adjusting a security profile for one or more additional endpoint devices previously identified in a database of network users as associated with the user; and
    processing network traffic to and from the endpoint and the one or more additional endpoint devices according to the adjusted profile of the user associated with the endpoint.

2. The method of claim 1, wherein the security weakness includes one or more of a phishing vulnerability and missing security updates.

3. The method of claim 1, wherein the electronic communications include at least an attached document, a user identifier, and executable code embedded within the attached document, the executable code configured to transmit the response object and the user identifier from the endpoint when the attached document is opened.

4. The method of claim 3, wherein the electronic communications include human readable text including an instruction to the user to open the attached document.

5. The method of claim 1, wherein adjusting the profile of the user includes increasing detection sensitivity for at least one of a static detection antimalware agent, a dynamic behavior antimalware agent, a firewall, a blacklist, and a whitelist.

6. The method of claim 1, wherein adjusting the profile of the user includes associating the user with a group of users corresponding to the threat assessment failure.

7. The method of claim 6, wherein processing the network traffic includes, at a network device of the enterprise network, applying a network policy to the network traffic associated with the group of users.

8. The method of claim 1, wherein the network traffic is processed at one or more of the endpoint and the one or more additional endpoint devices, a firewall, or a wireless access point of the enterprise network.

9. The method of claim 1, wherein processing the network traffic includes coloring network packets from the endpoint according to the adjusted profile of the user associated with the endpoint.

10. The method of claim 1, wherein processing the network traffic to and from the endpoint according to the adjusted profile of the user includes restricting network traffic between the endpoint and resources outside of the enterprise network.

11. The method of claim 1, wherein the response object includes a Uniform Resource Locator (URL).

12. The method of claim 1, further comprising generating the electronic communications containing the response object, wherein each of the electronic communications is customized for at least one of a name, a user identifier, a title, or an organizational role of one of the users of the enterprise network.

13. A computer program product encoded on one or more non-transitory computer storage media, the computer program product comprising instructions that, when executed by one or more computing devices, cause the one or more computing devices to perform operations comprising:
  selecting a security weakness for users of an enterprise network;
  transmitting electronic communications to the users of the enterprise network, the electronic communications containing a response Uniform Resource Locator (URL) corresponding to the security weakness;
  detecting a request from an endpoint to the response URL;
  determining that a threat assessment failure related to the security weakness has occurred based on detecting the request to the response URL from the endpoint;
  for a user associated with the endpoint, adjusting a profile of the user based on a determination that the threat assessment failure occurred, wherein adjusting the profile of the user includes adjusting a security profile for one or more additional endpoint devices previously identified in a database of network users as associated with the user; and
  processing network traffic to and from the endpoint and the one or more additional endpoint devices according to the adjusted profile of the user associated with the endpoint.

14. The computer program product of claim 13, wherein adjusting the profile for the user includes increasing detection sensitivity for at least one of a static detection antimalware agent, a dynamic behavior antimalware agent, a firewall, a blacklist, and a whitelist.

15. The computer program product of claim 13, wherein processing the network traffic to and from the endpoint according to the adjusted profile of the user includes restricting network traffic between the endpoint and resources outside of the enterprise network.

16. A system for computer network security, the system comprising:
  a plurality of endpoints coupled to an enterprise network; and
  a threat management facility in a communicating relationship with the plurality of endpoints, the threat management facility including a processor and a memory, the memory having stored thereon instructions executable by the processor to perform the steps of:
  selecting a security weakness for users of an enterprise network;
  transmitting, to the users of the enterprise network, electronic communications containing a response object corresponding to the security weakness;
  detecting a request, from one of the plurality of endpoints, associated with the response object;
  determining that a threat assessment failure related to the security weakness has occurred based on detecting the request from a user associated with the one of the plurality of endpoints;
  based on a determination that a threat assessment failure occurred, adjusting a security profile for at least one additional endpoint device previously identified in a database of network users as associated with the user in the plurality of endpoints; and
  processing network traffic to and from the one of the plurality of endpoints and the at least one additional endpoint device according to the adjusted security profile of the user.

\* \* \* \* \*